US012754440B1

(12) United States Patent
Mikkelson

(10) Patent No.: US 12,754,440 B1
(45) Date of Patent: Oct. 6, 2026

(54) RETICLE AND ANALYSIS METHODS TO IMPROVE AUTOCOLLIMATOR ACCURACY AND REDUCE MEASUREMENT ERROR

(71) Applicant: Dennis Mikkelson, Menomonie, WI (US)

(72) Inventor: Dennis Mikkelson, Menomonie, WI (US)

( * ) Notice: Subject to any disclaimer, the term of this patent is extended or adjusted under 35 U.S.C. 154(b) by 372 days.

(21) Appl. No.: 18/394,334

(22) Filed: Dec. 22, 2023

(51) Int. Cl.
*G01B 11/26* (2006.01)
*G02B 27/32* (2006.01)

(52) U.S. Cl.
CPC .............. *G02B 27/32* (2013.01); *G01B 11/26* (2013.01)

(58) Field of Classification Search
CPC ................................ G02B 27/32; G01B 11/26
See application file for complete search history.

(56) References Cited

U.S. PATENT DOCUMENTS 4,058,899 A * 11/1977 Phy ........................ G01B 11/26 33/26

FOREIGN PATENT DOCUMENTS

| | | | | |
|---|---|---|---|---|
| CN | 105526868 A | * | 4/2016 | G01B 11/002 |
| CN | 114111570 A | * | 3/2022 | G01B 11/002 |
| DE | 202004009727 U1 | * | 10/2004 | G01B 11/26 |
| EP | 3438604 A1 | | 2/2019 | |

OTHER PUBLICATIONS

EPO and Google, Patent Translate, English machine language translation of the cover page/abstract, specification and claims of EP3438604A1.

* cited by examiner

*Primary Examiner* — Mark Hellner
(74) *Attorney, Agent, or Firm* — Anthony J. Bourget

(57) ABSTRACT

Reticles, autocollimators, systems, and methods for measurement of angles including a reticle having at least one line which produces a line image on a sensor where the line image is mismatched with respect to vertical and horizontal reference lines of pixels of the sensor such that periodic measurement error due to regular spacing between pixels is reduced or eliminated. In aspects an autocollimator includes a reticle comprising a pattern having a first line with a slope and a second line with an inverse of the slope, the lines being other than parallel.

32 Claims, 18 Drawing Sheets

Replacement Sheet

RETICLE AND ANALYSIS METHODS TO IMPROVE AUTOCOLLIMATOR ACCURACY AND REDUCE MEASUREMENT ERROR

BACKGROUND OF THE INVENTION

An autocollimator is an optical instrument used to accurately measure small angles with high sensitivity and high accuracy. FIG. 1 shows an optical layout for a basic autocollimator 100. Essentially an autocollimator combines two functions, an image projector 122 and a telescope 124. The projected image 126 of a reticle 130 is reflected back to the autocollimator by a mirrored test surface 128 whose tilt angle is to be measured.

The reticle projection optical path 136 starts with the light from the light source 132 passing through the reticle 130, reflecting off a diagonal of the beamsplitter 140 and passing through the objective lens 150. The total distance from the reticle 130 to the objective lens 150 is set to be the focal length of the objective lens 150, so the light passing through a single point on the reticle 130 will be projected out from the objective along parallel lines. That is, the projector portion projects the image of the reticle "to infinity".

The return optical path 138 through the telescope 124 is from the test mirror 128 back through the objective lens 150, straight through the prism beamsplitter 140 to the image sensor 160. The distance from the objective lens 150 to the image sensor 160 is set to be the focal length of the objective lens 150, so the telescope portion 124 is also focused at infinity. The telescope portion focuses the reflected image of the reticle on the image sensor 160. The position of the reflected image on the sensor is used to determine how much the test mirror is tilted away from being perpendicular to the optical axis of the autocollimator. If the mirrored test surface is exactly perpendicular to the optical axis of the autocollimator, the reflection will be back in exactly the same direction, and the reticle image will be centered on the image sensor. If the mirrored test surface is slightly tilted the reticle image will be correspondingly offset from the center of the sensor.

A beamsplitter 140 is used to superimpose the optical axis of the projector portion and the telescope portion of the instrument. Consequently, the placement of the reticle/light and the image sensor can be interchanged and often are interchanged on different instruments.

The sensitivity of commercial autocollimators ranges from a few arcseconds down to a few thousandths of an arcsecond for high end instruments. High accuracy instruments typically use one or two dimensional pixelated CCD or CMOS detectors. With typical objective focal lengths and pixel sizes such high sensitivity requires determining the position of the reticle image on the sensor within a few thousandths of a pixel's dimensions.

One problem that must be dealt with to obtain the highest sensitivity and accuracy is a low-level periodic error due to the use of a pixelated detector. Since the reticle image is sampled on a regular grid of pixels, one component of the error function tends to be periodic with period corresponding to the spacing between successive pixels. Specifically, as the test object 128 is slowly rotated through a very small interval of angles, so that the effective center of the reticle pattern moves by the width of one pixel, there will be errors within that small interval of angles due to the detailed structure of the pixels. Assuming the pixels are identical, and the reticle image is not changing, if the test object is again rotated so the effective center of the reticle pattern moves by another pixel width, the error pattern will repeat.

This behavior is shown in FIG. 2, which shows an error function for a test autocollimator over a small interval. The test autocollimator in this case has a two dimensional CMOS image sensor with a square pixel size of 3.1 microns and an objective lens with a focal length of approximately 500 mm. The reticle used is a simple dark field crosshair reticle with one illuminated vertical line and one illuminated horizontal line. The horizontal position of the reticle image on the sensor is calculated based on the vertical crosshair's position. The graph in FIG. 2 shows the measurement error as the test object is gradually rotated by a little less than nine arcseconds. In this example, as the test object is rotated by that amount, the reticle image sweeps across fourteen pixels so the basic error pattern in the calculated position as the image moves one pixel width is repeated fourteen times. The period of the error function shown corresponds precisely to the pixel spacing on the sensor. While this error is small, about 0.030 arcseconds peak to peak, it can cause problems for very precise measurements.

To clarify this, assume that the image of the vertical crosshair is not distorted and is exactly aligned with the columns of pixels and that each row of pixels is identical to every other row. In that case the horizontal position of the reticle image can be calculated from any row (other than those affected by the horizontal crosshair) with the same result. Specifically, as the vertical crosshair's image is moved horizontally across the sensor, the errors in the calculated positions based on each individual row will trace out the same error function in phase. Averaging the horizontal position information from multiple rows, as was done to produce FIG. 2, reduces random measurement noise, but preserves the periodic error common to all of the rows. We can combine the calculated horizontal position from multiple rows in several ways to reduce noise, but that will not help solve the problem with the common periodic error function. Before describing the present invention, it is useful to first discuss a prior art technique. Additional information about the reticle image position can be used to smooth out the periodic variation in the error function. One approach is to use a reticle with more than one vertical line. As an example, suppose a special reticle was made with three vertical lines.

If the three vertical lines were to be spaced so that their images on the sensor are separated by an integer number of pixels, then because of the periodic error, position values based on each of the three lines would still trace out the same error function in phase and would still not reduce the periodic error. In such case, if the effective position of the reticle image is calculated as the average of the positions of the three lines, the error would just be the average of the errors at the corresponding points along the same periodic error function. Although random noise in the measurements would be reduced by averaging the results from three lines, the periodic error function will remain the same as given by the original periodic error.

However, suppose the reticle lines are very carefully spaced so that the image of the second line is shifted by ⅓ pixel more (at ⅓ phase), and the image of the third line is shifted by ⅔ pixel more (at ⅔ phase) than an integer number of pixels. In that case the error functions for position values based on the images of the three lines would each be out of phase with each other. At any point, the effective position of the reticle can be calculated as the average of the positions of the three vertical lines. The error in the average would be the average of the basic periodic error at three distinct points equally spaced along one cycle of the error function. This resulting error will typically be substantially less than the maximum error and the overall resulting error function will be reduced in amplitude. While this concept has been used successfully for some excellent commercially available autocollimators, there are drawbacks. First, the actual construction and alignment of an instrument using this approach requires high precision and can be an expensive process. Second, enough space between the lines must be provided so that light scattered or diffracted from one reticle line does not bleed over into the region near another reticle line. Various commercial and custom experimental instruments have used from two to more than thirty distinct vertical lines. As more lines are added, more space is required, and making an autocollimator to measure tilts about both a vertical and horizontal axis using only one reticle with both horizontal and vertical groups of lines becomes more difficult. The Moller Wedel Elcomat autocollimators solve this problem by incorporating two separate units along the same optical axis, one to measure test mirror tilts about a vertical axis and the other to measure tilts about a horizontal axis. Each unit has its own linear sensor, beam splitter and reticle with multiple parallel lines, optically perpendicular to the line of linear sensor pixels. The optical axes of the two units are combined and directed through one shared objective by a third beam splitter. Measurements of test mirror tilts about a vertical or horizontal axis are made alternately many times per second, by alternately illuminating one reticle and calculating the position of the returned image on the corresponding linear sensor, then illuminating the other reticle and calculating the position of the returned image on the other linear sensor. While this solution works, the instruments are expensive. There is room for improvement.

SUMMARY OF THE INVENTION

In addition to addressing problems with periodic error, the present invention addresses problems with accurately determining the position of the reticle image on an area sensor. The extremely sensitive and accurate measurement by an autocollimator of small angular tilts of a test surface requires determining the position of the reticle image on the surface of the sensor/detector with extreme accuracy. In an autocollimator 300, a representative example of which was used by the Applicant, measuring tilts with a sensitivity of 0.001 arcseconds requires determining the reticle image position within approximately $\frac{1}{650}^{th}$ of a pixel. Other instruments with comparable accuracy requirements may use different objective lens focal lengths and sensor pixel sizes, yet still have qualitatively similar high accuracy requirements for determining the reticle image position. Typical image processing methods for finding lines in an image do not provide this level of accuracy. Consequently, Applicant has developed novel reticle designs and corresponding analysis methods and associated instruments to both solve the problem of the periodic error and the problem of very accurately determining the position of the reticle image on the sensor.

The solutions described in the present application take an approach different than use of reticles having multiple vertical lines to address the periodic error. Rather than adding multiple carefully spaced vertical lines to introduce phase shifts of the error function when measuring tilt angles of the test object around vertical axes, in one aspect the present invention uses a reticle for which the lines (or a line) are no longer vertical and horizontal with respect to the pixel array, but have carefully chosen slopes. In aspects, the slopes of the lines of the pattern produced by the reticle are mismatched with respect to reference lines corresponding to an array of pixels of the sensor. In aspects the invention includes selecting and utilizing a slope of a line of the reticle pattern such that comparing measurements of rows having different and/or shifted phases due to the mismatched or particular line slope effectively reduce or eliminate the periodic error. In one aspect, a line image having slope +2 will have its light intensity measurement shifted by ½ pixel every successive row, i.e., at slope +2 the row above or below a particular row will be shifted ½ pixel out of phase compared to the subject row, while a row twice removed from the particular row will be at the same phase. Combining the light intensity information from adjacent rows reduces or eliminates the periodic error.

In the simplest case, in one aspect a standard dark-field crosshair reticle may be rotated about its center in the plane of the reticle, so that the vertical line of the crosshair changes to a line with slope +2, and the horizontal line changes to a line with slope −½. This has the advantage that the slope +2 line will cross successive rows of pixels with a phase shift of ½ period compared to the previous row. Consequently, the errors in the measured cross-sectional intensity values of the slope +2 reticle line due to the pixel structure along one detector row will be shifted by ½ period relative to the errors in the previous row and there is significant cancellation of the periodic error when this information is combined. Similarly, the slope −½ line will cross successive columns of pixels with a phase shift of ½ period compared to the previous column. To find the effective center position of such a rotated reticle, it is sufficient to find the equations of the slope +2 line and the slope −½ line and then calculate the point of intersection. The above orientation assumes the pixels are square and arranged in a rectangular array with horizontal rows and vertical columns.

This basic idea can be extended and improved in several ways. First, in one aspect as shown in FIG. 3A, a second set of lines with slopes −2 and +½ is added to the reticle 330. This essentially splits the vertical crosshair into two separate lines with slopes +2 and −2, and splits the horizontal crosshair into lines with slopes +½ and −½. When more than two lines are used, the effective position of the reticle image on the detector can be defined as the average of the intersection points of all pairs of reticle lines. In aspects the region near the center of the reticle pattern is omitted since the images of the intersecting lines run together and the intensities required to define the center of a reticle line in a particular row or column overlap with light from the other nearby lines. Also, in order to minimize the effects of any imperfections or contamination of the reticle, it is desirable to use the same portion of the reticle image for calculating the effective position of the image regardless of where the reticle image is positioned on the detector/sensor. In one aspect, to provide for a useful range of measurement the operable reticle pattern is restricted to a smaller region which is also indicated in FIG. 3A.

Second, this concept can be extended to reduce higher order harmonics in the periodic error function by using lines with slopes +−3 and +−⅓ or +−4 and +−¼, etc. See FIG. 4. In the case of a line image having slope +3, for instance, the phase shift would be ⅓ for each adjacent row. Thus, combining the intensity data from groups of three successive rows when utilizing a line having +3 slope would result in the desired cancellation, reduction or elimination of the period error. For the ⅓ phase shift scenario the information from groups of 3 adjacent rows are combined to have error cancellation (by combining the errors from rows with all three phase shifts, i.e., using a sequence of consecutive rows containing a multiple of 3 rows). Similar adjustment to the combining of respective rows would occur when addressing the different harmonics of the periodic error using different slopes. Third, instead of one large reticle pattern as shown in FIG. 3, a reticle consisting of an array of smaller patterns is or may be employed, as in FIG. 5A. In such case the position of the full reticle image on the sensor may be calculated from the positions of the smaller individual patterns.

In further aspects of the invention, and in addition to combining data from rows and columns in a way that combines error functions with different phases, this also has the advantage of obtaining more data from a larger area of the detector/sensor. Averaging data from more pixels reduces measurement noise and reduces the effects of small, localized imperfections in the sensor and imaging optics.

In aspects, the prototype instrument which was used to produce the graph of the periodic error in FIG. 2 was re-configured with the custom reticle shown in FIG. 3A. The measured error function for the resulting instrument is shown in FIG. 8. The fundamental periodic error has been reduced (or nearly eliminated) to be within the lowest error level that can be measured with the equipment.

Figure 1:
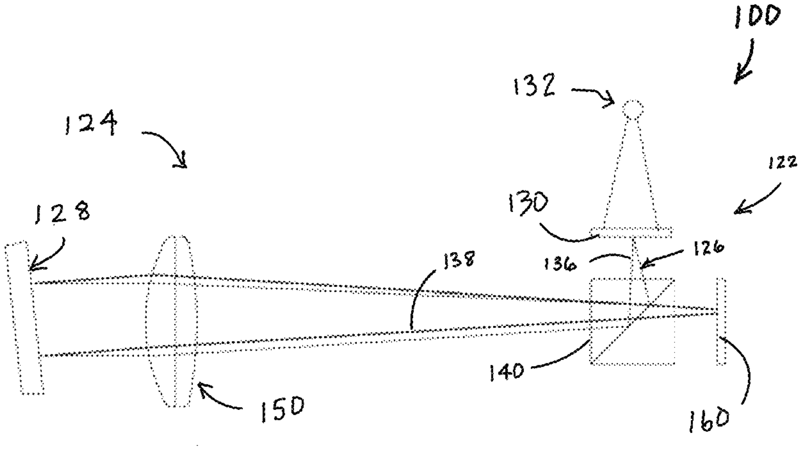
Fig. 1 (Prior Art)
FIG. 1 is a schematic view of a representative prior art autocollimator together with a test object or test mirror.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents and alternatives falling within the spirit and scope of the invention and as detailed by the appended claims.

DETAILED DESCRIPTION OF THE INVENTION

Referring to FIGS. 3-15, aspects of autocollimators, reticles, systems and methods of the invention are shown. Autocollimator 300 (See FIG. 6) is an optical instrument for accurately measuring a small angular rotation of a test surface or test mirror 328 about one or two axes perpendicular to the optical axis 334 of the autocollimator 300. High accuracy electro-optical autocollimators such as autocollimator 300 project the image of a reticle 330 (focused at infinity) through an objective lens 350 towards the test surface 328 which reflects the image back through the objective 350 which in turn focuses the reticle image 326 onto a position sensitive detector 360. For high resolution and accuracy, the position sensitive detector 360 is typically a one or two dimensional pixelated sensor 360. Autocollimator 300 shown in FIG. 6 is a conceptual representation of aspects of a prototype instrument used by Applicant.

Figure 3A:
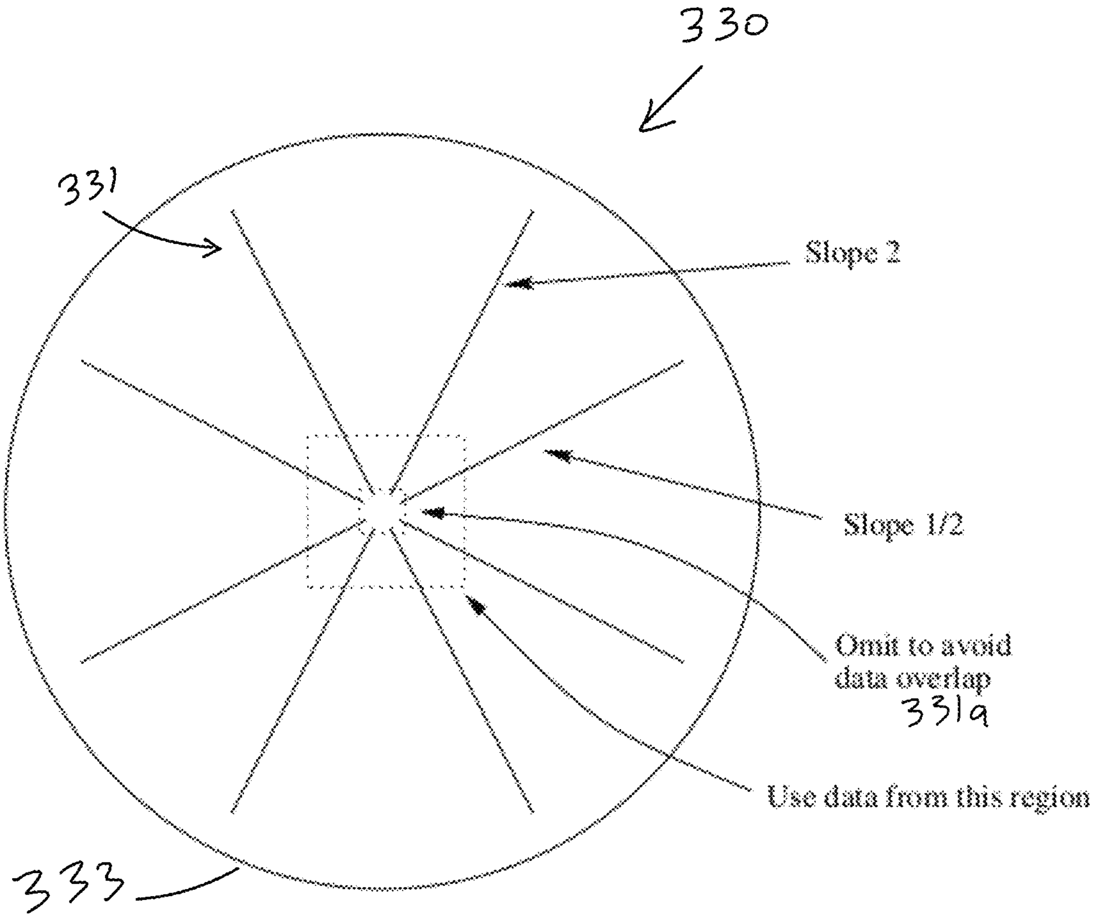
FIG. 3A is an example of one embodiment of a reticle in accordance with the present invention.

In one aspect reticle 330 includes a transparent base 333 or substrate upon which is etched, coated or presented, a pattern 331 (See FIG. 3A). For illustration purposes, the pattern 331 shown in FIG. 3A appears as a bright field reticle, however in reality the reticle 330 is typically a dark field reticle 330 made by laser cutting very fine lines in an opaque coating on glass, or made by a photo etching process (the same or similar methods used to produce photo masks for integrated circuit fabrication). In one aspect, the base 333 of reticle 330 has a thickness of about 1.5 to 2.5 mm and a diameter of about 20 to 25 mm. Reticles having different base dimensions may be used. The reticle 330 may include a border or frame in which the base is positioned so that the reticle may be conveniently secured to an instrument or autocollimator 300. The lines or pattern 331 shown on the reticle 330 in FIG. 3A are very fine lines that have been produced to allow light to pass through the lines (while light is masked or blocked from the balance of the reticle 330, i.e., a dark-field reticle). A more particular representation would be a black disk with very thin white lines, yet because the lines are so narrow, they would not appear easily to the naked eye and are difficult to represent in black and white figures except as a representative bright field reticle. Both bright field and dark field reticle varieties may be used in accordance with the invention. A dark field reticle typically has an advantage because it allows less light to pass through the reticle, reducing the opportunity for errant or scattering light.

Typical high-end autocollimators such as autocollimator 300 have objectives 350 with focal lengths roughly between 200 mm and 1 meter and resolve small angular rotations of the test surface 328 on the order of 0.001 arcseconds. These autocollimators 300 also typically have sensors with pixel sizes roughly in the range of 3 to 10 microns. A prototype autocollimator 300 used by the applicant has a 500 mm focal length objective 350 and a sensor 360 with 3.1 micron square pixels. The array of pixels 361 are arranged in rows and columns as is typical, and define vertical and horizontal reference lines along the respective vertical and horizontal arrangement. A useful coordinate system is based on the rows and columns of the sensor's pixels, where the rows of pixels are assumed to be in the horizontal "x" direction and the columns of pixels are assumed to be perpendicular to the rows and are in the vertical "y" direction. The parameters discussed for applicant's prototype instrument 300 are a representative example, and specific values may be adjusted for other instruments. The reticle 330 configuration and analysis and methods apply to other instruments, even those of heretofore lower-end instruments. The reticle 330 configuration and analysis and methods may also apply to instruments other than autocollimators, and within different industries including photo mask alignment, or other industries.

To achieve resolutions on the order of 0.001 arcseconds typical high accuracy autocollimators 300 need to determine the position of the reticle image 326 on the sensor 360 with extreme sub pixel accuracy. For applicant's prototype 300, a rotation of the test surface 328 about a vertical axis by approximately 0.65 arcseconds causes a shift of the reticle image 326 by one pixel on the detector 360. To get a sensitivity of 0.001 arcsecond, the position of the reticle image 326 on the sensor must be determined to within 1/650th of the width of a pixel. A representative portion of an array of pixels 361 is presented at FIG. 7A, discussed further below.

Figure 2:
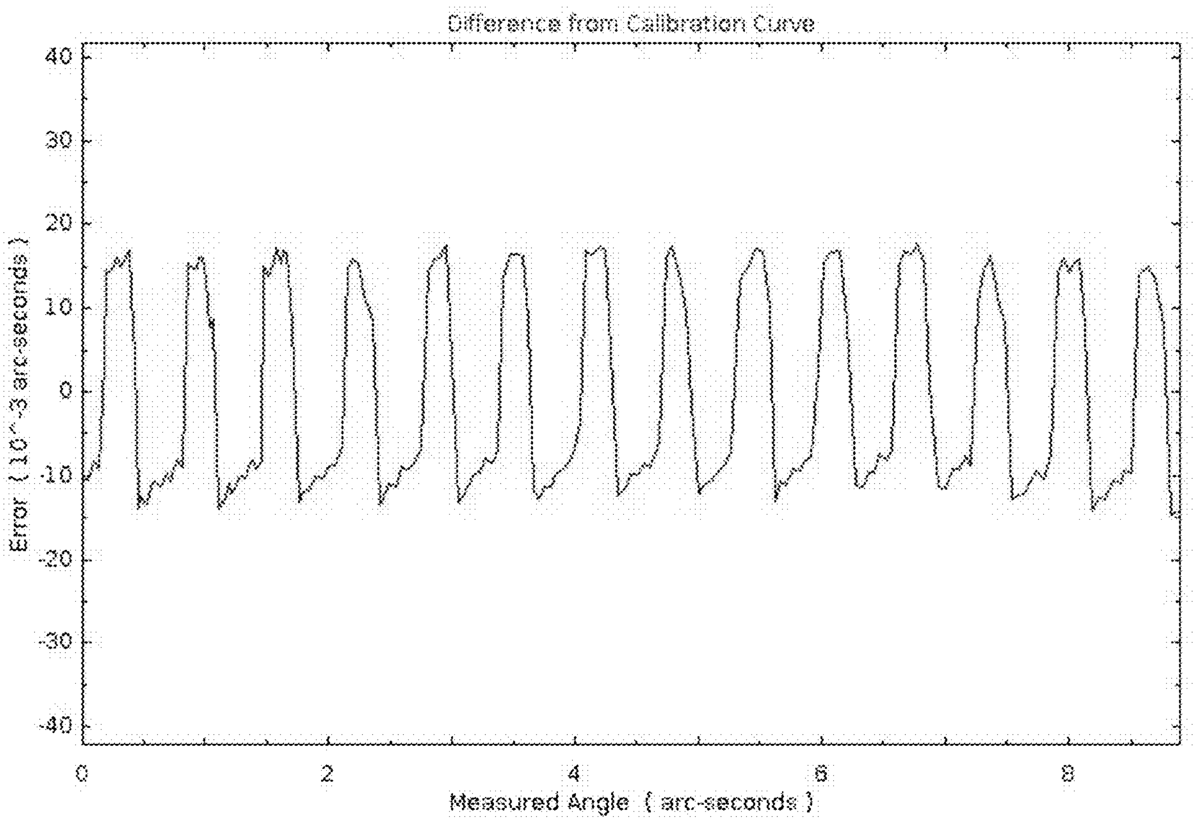
FIG. 2 is the graph of the measured error for an autocollimator using a conventional crosshair reticle and analysis method with a pixelated detector/sensor.

A simple conceptual model of a pixel is of a square uniform photosensitive area filling the entire surface area associated with that pixel 361. Because actual sensor pixels are more complicated than that, the square region of the sensor assigned to that pixel will not be uniformly sensitive to light. Parts of the area may be occupied by pixel boundaries, associated circuitry, micro-lenses, filters, etc. The response to light of the nominal surface area of the pixel is not necessarily uniform across the surface of the pixel. Assuming the pixels are identical and the optical system does not introduce significant geometric distortion, the pattern of intensities created by the reticle image 326 on the sensor 360 will be measured the same when the reticle image 326 is shifted horizontally by one pixel 361; the positions of the values would just have shifted by one column. Consequently, by whatever means the effective position is calculated from the intensities of the reticle image 326, if the image 326 is shifted by one pixel 361, the calculated effective position would also be shifted by one pixel 361. Ideally it would be relatively easy to calibrate the instrument at a fixed set of sample positions uniformly spaced so the reticle image 326 is shifted by the width of one pixel 362 between successive sample positions. Relative to that calibration the measurements should be correct at those fixed sample positions. However, since the response across a pixel is not uniform, as the image shifts from one of the fixed uniformly spaced sample positions to the adjacent sample position with the image shifted by one pixel, there will be errors at intermediate positions. The pattern of errors between two fixed sample positions will repeat between later pairs of sample positions, leading to a periodic error function. Such a periodic error function, due to the use of a pixelated area detector 360, was measured using applicant's prototype instrument 300 (but without applicant's reticle 330, or analysis methods) and the results are shown in FIG. 2.

If the reticle (such as a prior art reticle 130 shown in FIG. 1) has a single vertical line, perfectly aligned with the columns of the sensor 160 (assuming columns of the sensor are vertical), then for a given position of the reticle image 126 on the sensor 160, the measured intensities from each row will be the same, except for random noise. As a result, if the test surface 128 is rotated very slowly to shift the vertical line image horizontally by one pixel, the error in the calculated intermediate positions of the line image in each row will trace out the same error function, in phase. Summing or averaging the data from many rows will reduce random noise due to the averaging, but will not reduce the periodic error (as shown in FIG. 2) due to the pixelated detector 60 which is present in the data from each row.

The periodic error could, in principle, be reduced by somehow simultaneously sampling the reticle intensities on the original grid and on a second grid shifted horizontally by, say, half the width of a pixel. In that case as the test object rotates slightly to gradually shift the reticle image by one pixel, the errors in the measured intermediate positions based on the original grid would trace out one cycle of the periodic error function and the errors in the measured intermediate positions based on the shifted grid would also trace out one cycle of the periodic error curve, but those errors would be shifted to be out of phase by ½ cycle. Averaging the two sets of measurements would produce a new set of measurements with reduced error, since the errors would result from adding the error function to a copy of the error function that is exactly out of phase with the original.

The beneficial effect of simultaneous sampling on two grids of pixels with one shifted by half the width of a pixel can actually be achieved as follows. In one aspect of the invention, and instead of using a reticle with one or more vertical lines, a reticle 330 with a line with slope +2 is used. In such case, the intensity cross-section of the line image 326 along even numbered rows will be identical along each even numbered row, except for being shifted by one column in row 2n+2 compared to row 2n. Similarly, the intensity cross-section along odd numbered rows will be the same along each odd numbered row, except for being shifted by one column in row 2n+1 compared to row 2n−1. However, because the line's slope is +2, the intensity cross-section of the line in an even numbered row will automatically be shifted by half the width of a pixel compared to the intensity cross-section of the reticle image along an adjacent odd numbered row. The data from the even numbered rows plays the role of data from the original grid mentioned in the last paragraph and the data from the odd numbered rows plays the role of the data from the grid shifted by half the width of a pixel. By combining information from both even and odd numbered rows, the position error from the even numbered rows will be combined with the position error from the odd numbered rows, which is shifted by half the width of a pixel. Because the errors from even numbered rows are out of phase by ½ cycle relative to the errors from the odd numbered rows, the errors will cancel to some extent. That is, the errors in the average of positions calculated from even and odd numbered rows will typically be lowered due to the specific slopes of the reticle lines.

The same method is employed by replacing the horizontal line of a crosshair reticle 130 with a line with slope −½, as with a reticle 330 in a further aspect of the invention. In such case, the intensity cross-section of the slope −½ reticle image 326 along even numbered columns will automatically be shifted by half the width of a pixel compared to the cross-section of the reticle image 326 along odd numbered columns. Combining information from both even and odd columns when analyzing the data from the line with slope −½ similarly combines out of phase errors and leads to reduced error.

Figure 3B:
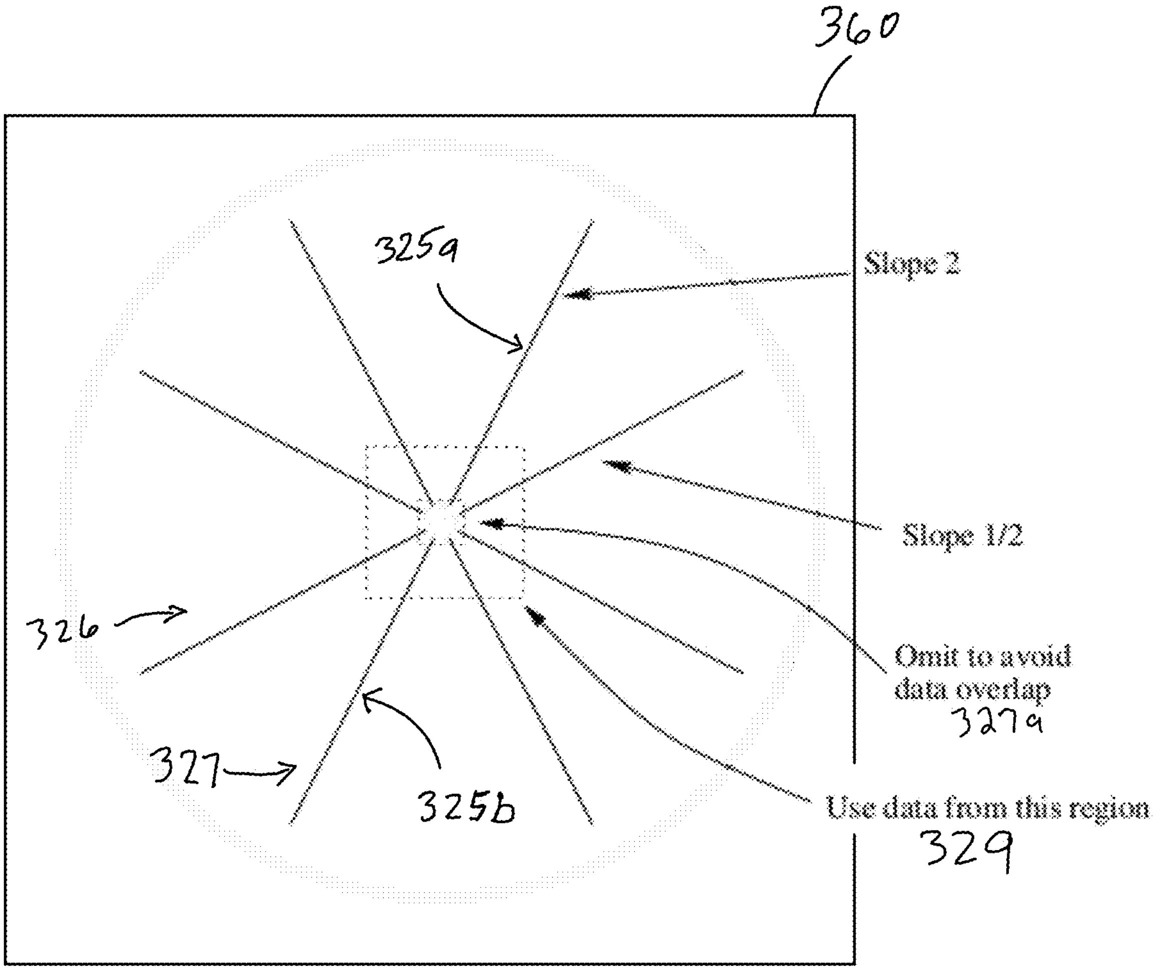
FIG. 3B is an example of a pattern or projected image from a reticle projected onto a sensor in accordance with aspects of the invention.
Figure 4:
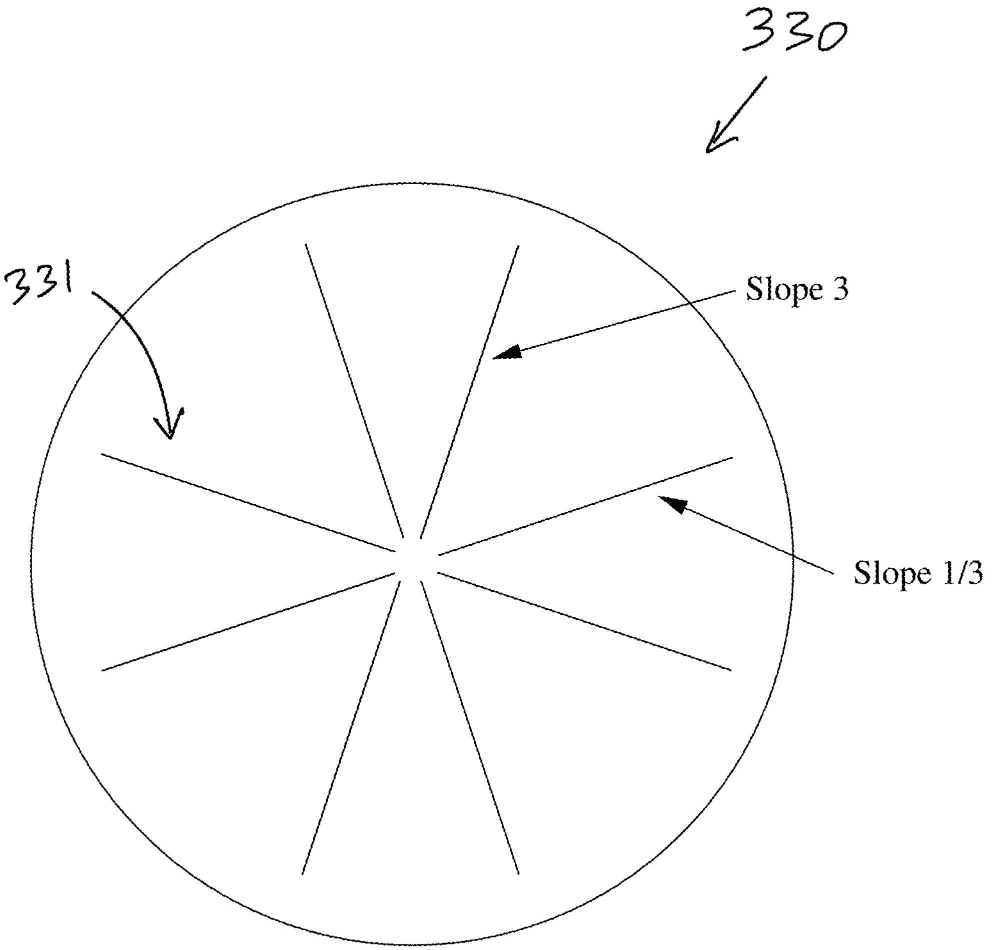
FIG. 4 is an example of another embodiment of a reticle in accordance with the present invention.

As shown in FIG. 3A and FIG. 3B, the technique is extended to include additional lines with slope −2 and +½. These techniques can be extended to reduce higher order harmonics in the periodic error function by using lines with slopes +−3 and +−⅓ or +−4 and +−¼, or +−5 and +−⅕, etc. FIG. 4 shows a reticle 330 similar to the one in FIG. 3A, except the reticle lines have slopes +−3 and +−⅓. In this aspect, every set of 3 adjacent rows (or three adjacent columns) will combine samples from three phases each shifted by ⅓ of a pixel relative to the previous row (or column). In other aspects, the techniques may be applied using reticles having lines with different slopes. It may be appreciated that in a case where there is a phase shift of ½ due to the line slope, multiples of 2 rows are combined, or where the phase shift is ⅓, multiples of 3 rows are combined, or with a phase shift of ¼, multiples of 4 rows are combined, etc. While ideally it is desired to combine data from the exact number of rows matching the phase shift, if a large number of rows is used, it is not critical. For instance, where combining pairs or groups of 50, 100 or even more (or less) groups of rows, including data from an additional single row will have no or insignificant impact.

Figure 7A:
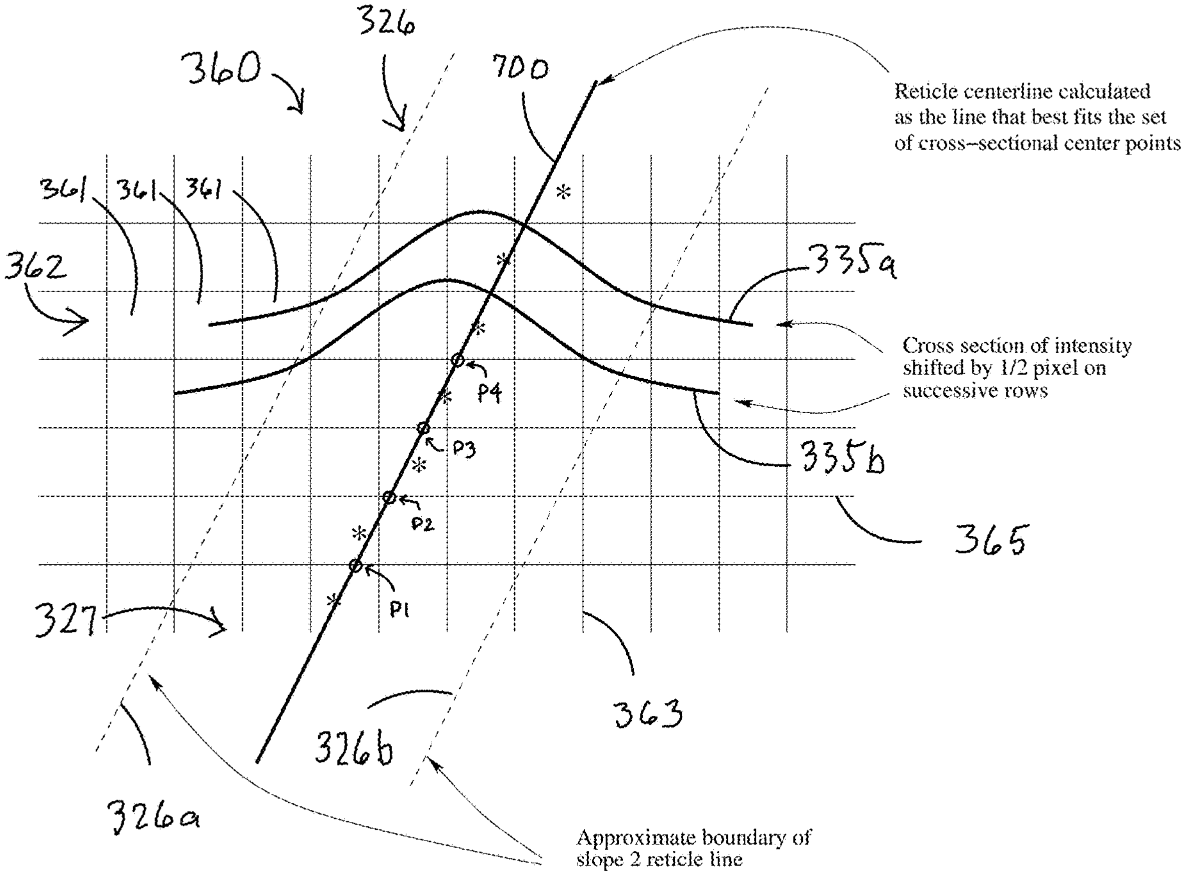
FIG. 7A is a representative close-up schematic view of a sensor and illustrates one method of calculating a position of a pattern or projected image in accordance with aspects of the present invention.

Further aspects of the elimination or reduction of the periodic error are address below, including with respect to FIG. 7A and the accompanying description. FIG. 7A shows a representative phase location (P1) of a projected line image of light on a pixel of a first row and a representative phase location (P2) on a pixel of a second row. Also shown is a third row having a pixel where a phase location (P3) of the projected line image coincides with the identical phase location of that of the first row, but shifted over to the right by the width of a pixel, which corresponds to the periodic error. More particularly, in one example image line 327 includes an approximate boundary of slope +2. The center of image line 327 in one aspect intersects a pixel row boundary at phase location P1, phase location P2, phase location P3 and phase location P4. Note the marked points P1, P2, P3 and P4 are shown at boundary lines or reference lines 365 of the pixels 361, rather than vertically centered inside the pixel area. Vertically centering the points in the pixel area would be better, yet they are shown in the drawing along the boundary lines for illustrative purposes because otherwise the points would be shown too close to the asterisks (*) which mark the computed centers of the intensity cross-sections in the rows as described below. It may be appreciated that with image line 327 having slope +2, phase location P1 will be identical to phase location P3, while phase location P2 will be identical to phase location P4, along the horizontal portions of the respective pixels of the alternating rows. The phase locations of P2, P4 are a ½ phase, or in this case, ½ pixel width, shifted from the phase locations P1, P3. Assuming square pixels, the slope +2 works to present adjacent rows having phase locations offset by ½; thus combining every other row allows for grouping together all rows having the same period error, and because the alternating rows are offset by ½ phase (or in this case ½ pixel width), when all rows are combined, the result cancels or nearly cancels the respective period errors. It may be appreciated that selecting the line slope to be +3, for instance, may coincide with a line image that presents three different consecutive phases relationships on the sensor; thus, using the successive rows (or columns) in groups of 3 will accommodate cancelling or reducing the periodic error.

In addition to the periodic error reduction or elimination aspects addressed above (and further addressed below), the invention includes special analysis methods (and special reticles) which improve determination of the position of the reticle image on the sensor and overall improved quality of data and analysis.

In further aspects, a central portion 331*a* of the pattern 331 on the reticle 330, as indicated in FIG. 3A, is excluded in the calculation or analysis of the data. Because the lines of the pattern 331, for instance, project toward a center and would otherwise intersect at the center of the pattern 331, light from adjacent lines at or near such center point or central location 331*a* impact the region around or adjacent each line, which region is needed to accurately find the center of the line in each row or column. As shown in FIG. 3B, the pattern 327 which is projected on to the sensor 360 is omitted at central portion 327*a* so interference from adjacent lines is not measured or is reduced. Also, as indicated by the larger dotted square or target area 329 in FIG. 3B, data from the outer portion of the pattern 327 is omitted in the final analysis so that the same portion (i.e., target area 329) of the reticle image 327 can be used over a fairly large region of the detector surface 360 without being clipped by the edge of the detector as the pattern 327 is moved about the sensor 360. Accordingly, improved analysis and data is achieved by selecting data readings only from pixels located beyond the central portion 327*a* and within the target area 329. It may be appreciated that utilizing data from a larger region of pixels provides slightly lower noise in individual readings, yet restricts the available measuring range where the larger region approaches a boundary edge of the sensor. Further, the inner portion 327*a* of pixels is not critical because the data from that region can be automatically omitted via the software of the system. Removing the data from the inner portion of the pattern 327*a* makes it easier to adjust the intensity of the light source to properly illuminate the reticle line segments without having to adjust for the brighter region where the full lines otherwise run together at portion 327*a*.

The use of intersecting lines whose slopes are chosen so that the image of a reticle line crosses successive rows (or columns) with different phase relationships, together with utilizing the specified analysis reference herein and also use of data only from the target area 329, produces measurements with reduced periodic error, high resolution, lower noise levels and excellent smoothness.

In further aspects, a position of the reticle image 326, 327 upon the sensor 360 may be determined using a variety of methods. It is important to make accurate, repeatable determinations of the location of the image 326, 327 in order to ascertain an amount of movement of the image as the test surface or mirror 328 moves or rotates. Determining a center point of intersecting lines or line segments of the reticle image allows for accurate determination of the location of the image. One method includes determining equations of intersecting lines of the image 327 to determine the point of intersection. For instance, the image data from the pattern 327 resulting from the projected image 326 projected from the reticle 330 in FIG. 3B is analyzed as follows. First, for the line segment 325*a* having slope +2 (extending up and right from the center), determine the center point of the line segment 325 in each row. Next, for the line segment 325*b* also having slope +2 (extending down and left from the reticle center), determine the center point of the line in each row. Next, determine the equation of the line which best fits all of the center points from both segment 325*a* and 325*b*. Each of the line segments associated with the other pairs of slopes (i.e., slope ½, slope −½ and slope −2) is treated similarly to determine four equations of four unbounded lines for the reticle having 8 "half-line" segments. After determining the four line equations, find the intersection point of each pair of distinct lines, then average the resulting 6 points and use that average position as the calculated/measured position of the center of the projected reticle image 326/pattern on the sensor 327.

As an example, consider finding the equation of the reticle line with slope +2, shown in FIG. 7A. Because the typical pixel size is very small, between 3 and 10 microns, the line width of a reticle line or from the pattern 327 on the sensor 360 is made considerably larger than the width of a pixel 361 to avoid excessive blurring due to diffraction effects and to provide a brighter image. Consequently, the intensity cross-section values along a row of pixels 361, 361 where the row crosses the reticle line image 327 (or vice versa) will cover multiple columns. See FIG. 7A. For illustration purposes, FIG. 7A shows a row 362 of pixels 361 where the projected line image 327 spans approximately 4 to 6 pixel widths. It may be appreciated that the pixels may be considerably smaller such that the line image 327 may span across many more pixels 361, including upwards of 20 to even 50 pixels or more. The line image intensity along a row can only be measured at discrete row and column positions, however, graphs of the cross-sectional intensity functions for two successive rows are shown roughly (and conceptually) as curves 335*a*, 335*b* in FIG. 7A, for example. The intensity of light will vary along the cross-section of the line image 327. (See for instance, FIG. 7B). The intensity may be higher (or lower) at one pixel compared to an adjacent pixel, and may (and does) vary across the row of multiple pixels. Typically the intensity of the light of the projected image 326 is greater toward the middle portion (at central pixels along a row) of the pattern 327 as compared to the intensity of light at pixels at the end or approximate boundaries 326*a*, 326*b*. Once the center points associated with the rows are determined (as noted below), those points are used to calculate a best fit line as the center line 700 of the image 326. The equation of the center line 700 is combined with equations of other and intersecting lines to determine the position of the image 326. More particularly, and appreciating that the line segments themselves do not necessarily intersect, extended line segments do intersect, and the intersection of the extended line segments is used to determine the position of the reticle image.

Determining the location of a center point (at which particular pixel or portion of a pixel) of the line image 327 is addressed herein. For each row, the position of the center of the line image intensity cross-section can be considered to be along the center (i.e., elevational midpoint of a pixel) of the row of pixels, however the position of the line image center will seldom be centered on a particular column center (i.e., horizontal midpoint of a pixel) but will be at some fractional column position (i.e., positioned to the right or left of the horizontal midpoint of a pixel). Various methods for determining the center of the line image cross-section are possible. Finding the column number of a pixel where the maximum intensity occurs will not produce a fractional column number for the line image center. While finding the column number of a pixel where the maximum intensity occurs will produce improved results compared to prior instruments and methods, it will not produce the higher quality of results where a fractional column number for the line image center is determined as in the present invention. Better options include finding the "center-of-mass" of the intensities along the row, or modeling and fitting an appropriate peak shape to the data from each row. A variety of methods may be used for modeling or determining where, along a width of a pixel (i.e., fractional column number) the center point for the cross sectional intensity of the image lies. In one non-limiting instance, a Gaussian distribution may be considered. Other models or distributions may be utilized. While the actual shape of the cross-section of the image of the reticle line or pattern 327 in a row is not necessarily exactly Gaussian, fitting a Gaussian curve to the data and taking the center of the Gaussian distribution to be the fractional column position of the line image center works well in the present invention. The resulting center points for the reticle line image 327 in each row are depicted by asterisks (*) in FIG. 7A. Note, particular asterisks are each centered (vertically) within its representative pixel. Note also the asterisks are positioned, left or right of center in the horizontal direction of the respective pixels, but may also be located on a reference line 363, for instance. Once the fractional center column number for the reticle line image 327 has been found in each appropriate row, the equation of the reticle line image or pattern 327 itself can be calculated by fitting a line to the data points. A variety of different best fit calculations may be used. One such line fitting is of a least squares fit variety, or other regression techniques may be used. The same approach is applied to find the equation of the image of the reticle line or pattern 327 with slope −2 (or other slope measures).

The reticle lines with slopes +−½ are treated similarly, except that the role of rows and columns are interchanged. For each column, the position of the center of the line image cross-section is considered to be along the center of the column of pixels (i.e., at a horizontal midpoint of the pixel). The fractional row number of the reticle line image 327 center is found by fitting an appropriate peak shape, such as a Gaussian, to the column of measured intensities and using the center of the peak for the fractional row number of the reticle line image cross-section center at the particular pixel. Given the center points of the reticle line image for each appropriate column, the equation of the reticle line image is calculated by fitting a line to the data points.

Figure 7B:
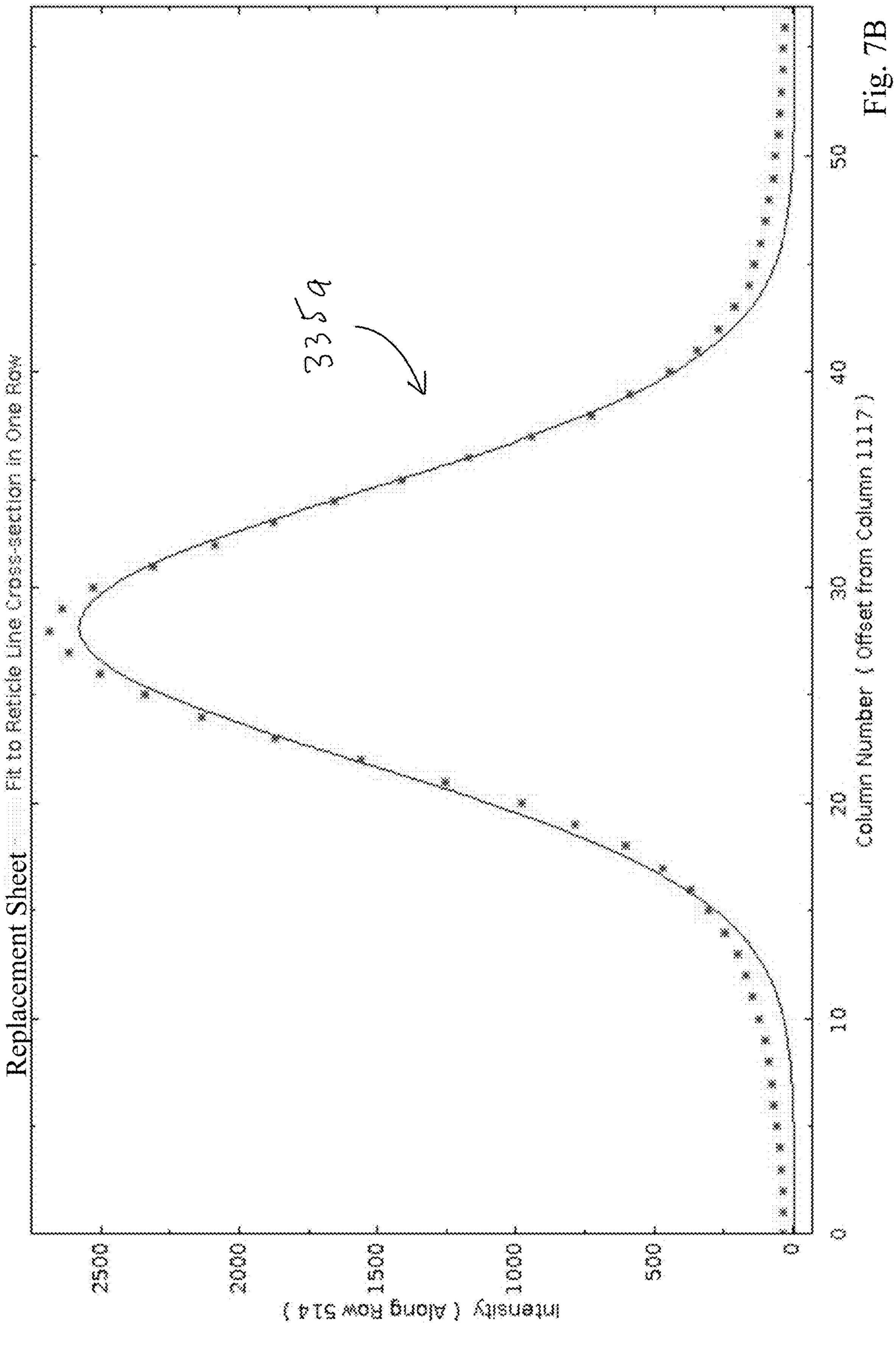
FIG. 7B is a graph of measured light intensity at various pixel locations in accordance with aspects of the invention.

In one non-limiting example and with respect to FIG. 7B, actual testing data of the intensity cross-section of a +2 sloped reticle line using 57 pixels in row 514 of sensor 630 is shown. The intensity value from each pixel is marked with an asterisk. The column number along the x-axis is offset so that column 0 corresponds to actual column 1117 of the sensor. The asterisk represents the only data received from the sensor. In this example the highest intensity pixel is at column 28 (offset from Column 1117). Yet if only the highest intensity pixel for the column number were used as the line's cross-section center, an error would result. As the line image was gradually scanned across the sensor, the highest intensity pixel would remain the same as long as the peak intensity was in that pixel. Yet in high quality instruments, there is a need to obtain precise location, requiring sub-pixel accuracy, i.e., down to 1/650 of a pixel or less. Because each pixel is so large compared to the required resolution, there is a desire to ascertain where on the pixel, or the fractional pixel amount, the center of the intensity lies. The solid line 335*a* shows the best fit of the measured data points (asterisk) using one model. In one aspect, the best fit is a Gaussian curve. The peak of the curve is a fractional column position 28.164. The curve/peak takes into account the overall behavior of the intensity on all 57 pixels. As the reticle image is gradually scanned to the right, even by less than a pixel width, the pixels on the left would gradually lose intensity and the pixels on the right would gradually gain intensity.

When fitting the peak with a curve, the peak would gradually shift to the right by small fractional pixel amounts, even though the maximum intensity pixel may stay the same. While the curve fit shown in FIG. 7B is good, it is not necessarily perfect. Different curve fitting calculations or models may be used to achieve better fitting.

Figure 8:
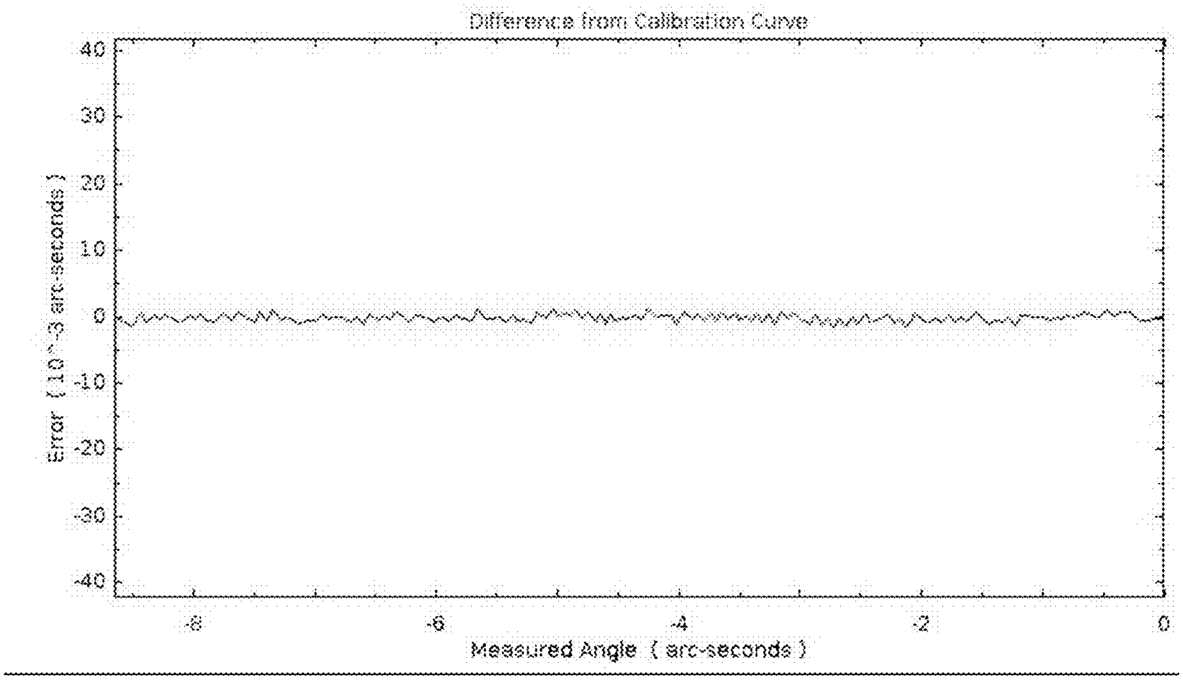
FIG. 8 is a graph of the measured error of an autocollimator in accordance with aspects of the present invention.

Finally, once the equation of each image line 327 has been found, the intersection point of each pair of lines (or line segments) is calculated and the average of the intersection points is taken to be the position of the reticle pattern 327 on the sensor 360. This analysis was applied to measurements obtained using the reticle from FIG. 3A. The results are shown in FIG. 8. This was the same basic experimental setup that produced FIG. 2 to demonstrate the periodic error except for the reticle and the data analysis have changed. The periodic error is essentially eliminated by applying the novel reticle and image analysis techniques of the present invention. Reducing the periodic error improves the quality of the data for determining, more precisely, the location of the line, which in turn improves the quality of determining a center of the reticle image, contributing to the improved data in FIG. 8. The above techniques used to determine the reticle image position on the sensor may also be used with reticles having lines with different slopes.

In further aspects, and to reduce or eliminate the periodic error for instance, the slope of the lines of reticle 330 mismatch the slope of reference lines 363, 365 (See FIG. 7A) corresponding to columns (or rows) of the sensor 360. For reference, a coordinate system used in this context is based on the rows and columns of the pixels 361 of the area sensor 360, where rows of pixels 361 are considered to be in the horizontal "x" direction and the columns of the pixels 361 are considered to be perpendicular to the rows and in the vertical "y" direction.

In one aspect, the slopes of the lines of the reticle 330 or pattern 327 produced by the reticle are configured so there is a mismatch between those lines or patterns with respect to reference lines 363, 365 associated with the columns and rows of the sensor 360. For instance, the reference lines 363, 365 in FIG. 7A correspond to vertical and/or horizontal aspects of the pixels 361 and sensor 360. Where the slopes of lines of the reticle 330 or pattern 327 do not match or align along the reference lines 363, 365, i.e., there is a mismatch between their slopes, the techniques of the present invention may be utilized to eliminate or reduce the periodic error.

It may be appreciated that in some cases the periodic error may also be essentially eliminated by utilizing the analysis methods and techniques of the present invention despite applying a standard cross-hair or other reticle having "horizontal" and/or "vertical" lines, provided such standard reticle is rotated such that the reticle lines are angled with respect to the vertical and horizontal reference lines 363, 365 of the image sensor 360. For instance, a standard cross-hair reticle may be rotated so that the cross-hair line images are at slopes mismatched from the reference lines 363, 365, and preferably mismatched to result in the phase-shift to eliminate the periodic error as noted above. For instance, in one aspect of the invention, an ordinary crosshair reticle is rotated such that at least one of the line patterns has slope +2 with respect to the reference lines 363, 365. Such rotation accommodates the phase shift noted above and the accompanying reduction or elimination of the periodic error in the horizontal direction, while also accommodating the location methods utilizing intersecting lines, and/or utilization of target area 329 analysis. Such rotation of the ordinary crosshair reticle will also result in a line having slope −½, which will also be phased to reduce the periodic error in the vertical direction, and provide another line intersect with the +2 sloped line to determine location of the image 327 on the sensor 360. Accordingly, aspects of the invention include retrofitting prior instruments by replacing (or adjusting) an existing ordinary crosshair reticle such that the lines are mismatched with respect to reference lines 363, 365 of the sensor of the existing instrument. In further aspects, the invention includes the foregoing replacement or adjustment of the ordinary (or other) reticle, together with utilizing the analysis and location methods described herein.

Figure 5A:
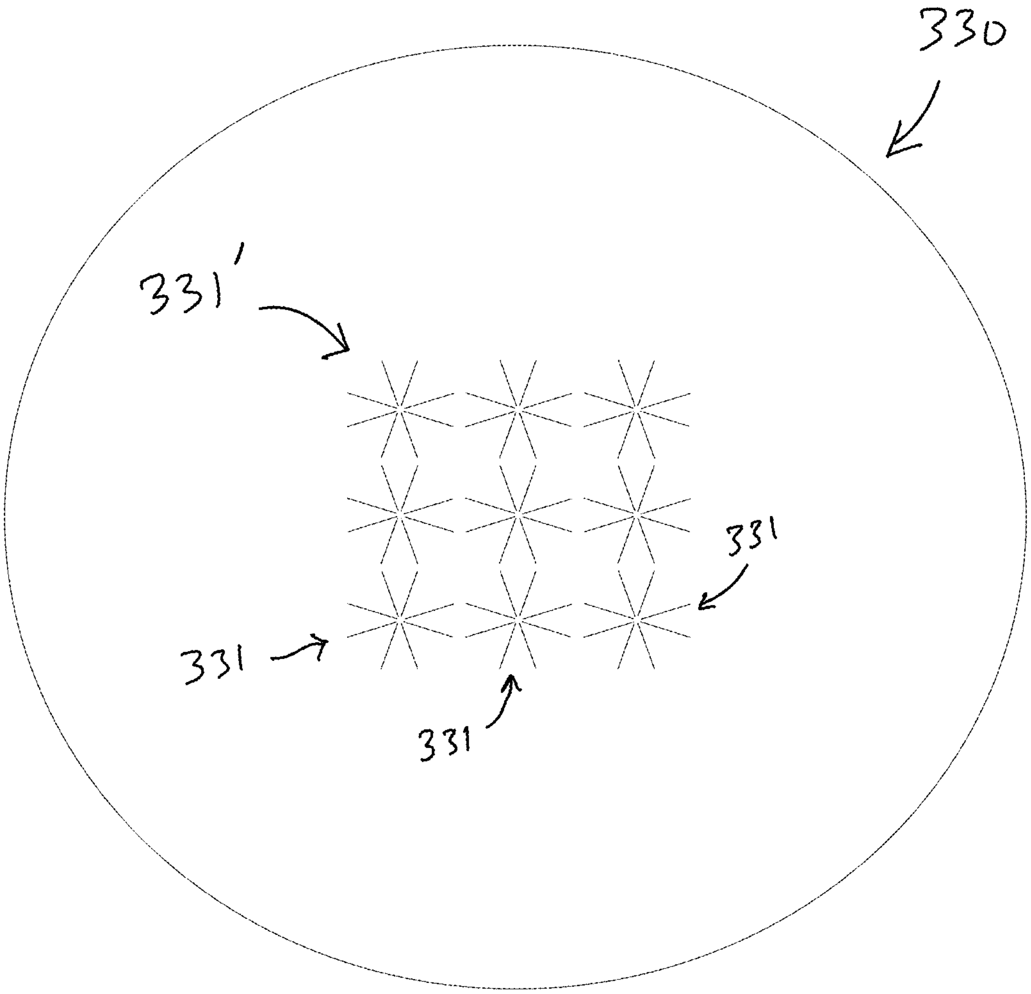
FIG. 5A is an example of an embodiment of a compound reticle and reticle pattern in accordance with the present invention.
Figure 6:
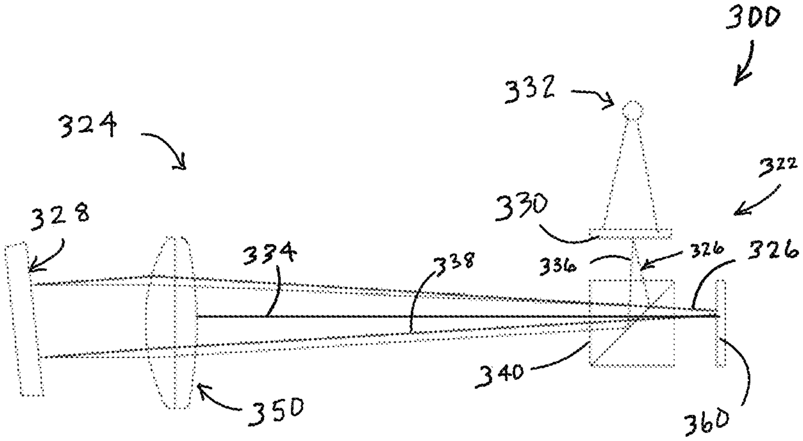
FIG. 6 is a schematic view of an autocollimator in accordance with aspects of the present invention together with a test object or test mirror.

In further aspects, instead of utilizing one large reticle pattern as shown in FIG. 3A, a reticle comprising of an array of smaller patterns may be employed, as in FIG. 5A. In this case the position of the full reticle image or pattern 327 on the sensor 360 may be calculated from the positions of the smaller individual patterns.

The reticle structure combined with the analysis technique described in this application solves the problem of periodic autocollimator errors due to the pattern of pixels on a two dimensional image sensor. The error graphs shown in FIG. 2 and FIG. 8 were obtained by rotating a test mirror to a sequence of test positions using a custom small angle generator. At each test position, after allowing time for the rotation mechanism to stabilize the rotation angle was measured on the small angle generator and the autocollimator for a period of time (approximately 10 seconds) to average out short term measurement noise. Because the short term noise in individual measurements was averaged out, and measurements were only made at a few hundred discrete angles, those graphs do not show some additional benefits of this invention.

Each measurement is based on data from a wide band of pixels around multiple lines covering a substantial area of the image sensor 360. In applicant's prototype instrument the region of data that is used near the center of the sensor is approximately 500 pixels square covering about 250,000 pixels. The curve fitting analysis uses approximately 15,000 pixels in each band of pixels around a portion of each of the eight half-lines shown in FIG. 3B. While the background regions of the bands overlap to some extent, a large portion of the region contributes to the calculation. By using data from such a large area of the sensor, the instrument becomes less sensitive to small localized imperfections in the image sensor and optical elements as well as to random noise from individual pixels. Also, by fitting an appropriate peak shape to the overall cross-sections of the line images, the calculated positions vary smoothly. The choice of which samples are used can have a significant effect on the results of a calculation. In particular, as a reticle line image 327 is scanned across the sensor 360, some new pixels 361 will be added at the leading edge of the band around the image 327, as some previously used pixels 361 along the trailing edge are removed from the band. By fitting the overall shape of the curve, including some low intensity background pixels at the edges of the band, the effect of these discrete additions and removals on the calculated peak position is reduced. Some measurements showing the benefits of the reduced noise and higher accuracy are shown in FIGS. 9, 10 and 11.

Figure 9:
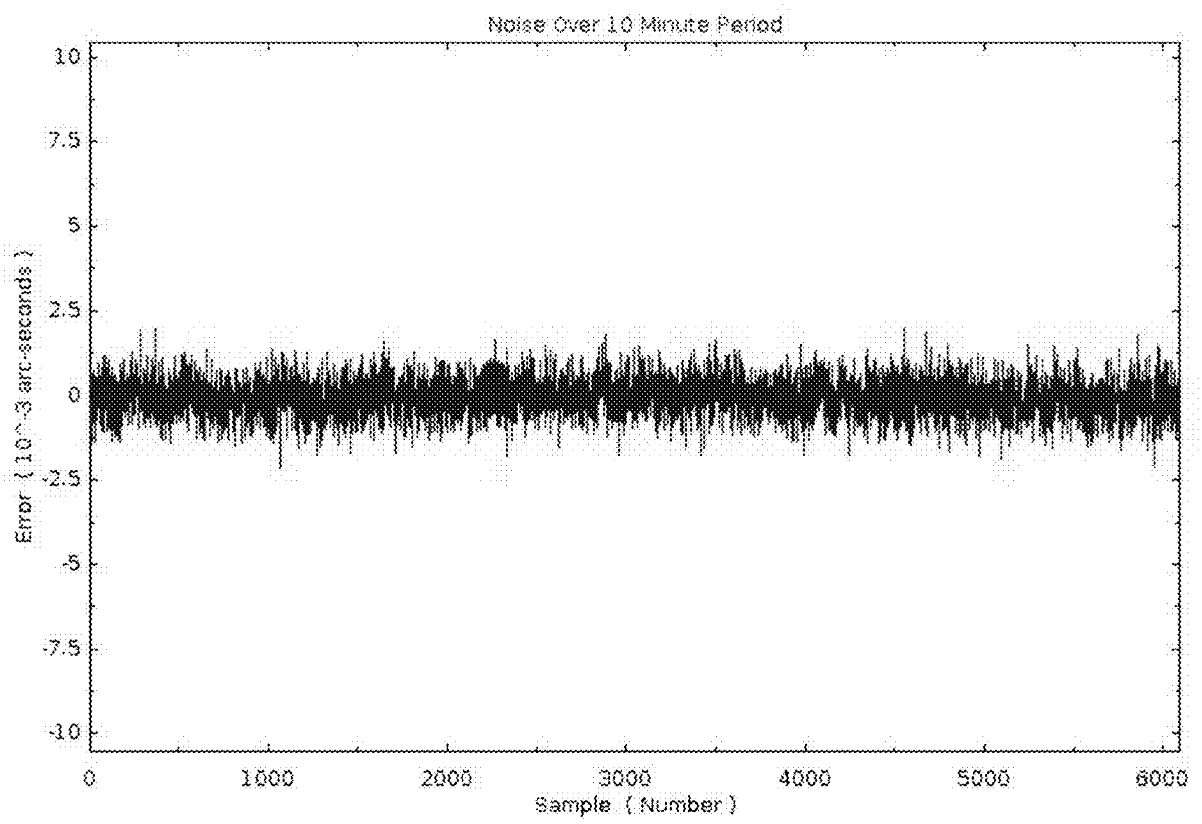
FIG. 9 is a graph showing the measured noise level of an autocollimator in accordance with aspects of the present invention.

FIG. 9 shows all individual measurements with the test angle held constant for a time period of about 10 minutes. No averaging or other data smoothing was applied to the raw measurements calculated by the method described herein. The RMS (root mean square) noise level is less than 0.0006 arc seconds with a peak deviation less than 0.0025 arc seconds. This is an exceptionally low noise level for such an instrument 300. The data rate is about 10 readings per second and the graph shows all of the roughly 6000 individual measurements taken during that 10 minute period with no smoothing or averaging of the measurements. The prototype instrument 300 uses an inexpensive CMOS sensor and single board computer for the data acquisition, analysis and display. Higher data rates are possible with a faster computer and faster sensor.

Figure 10:
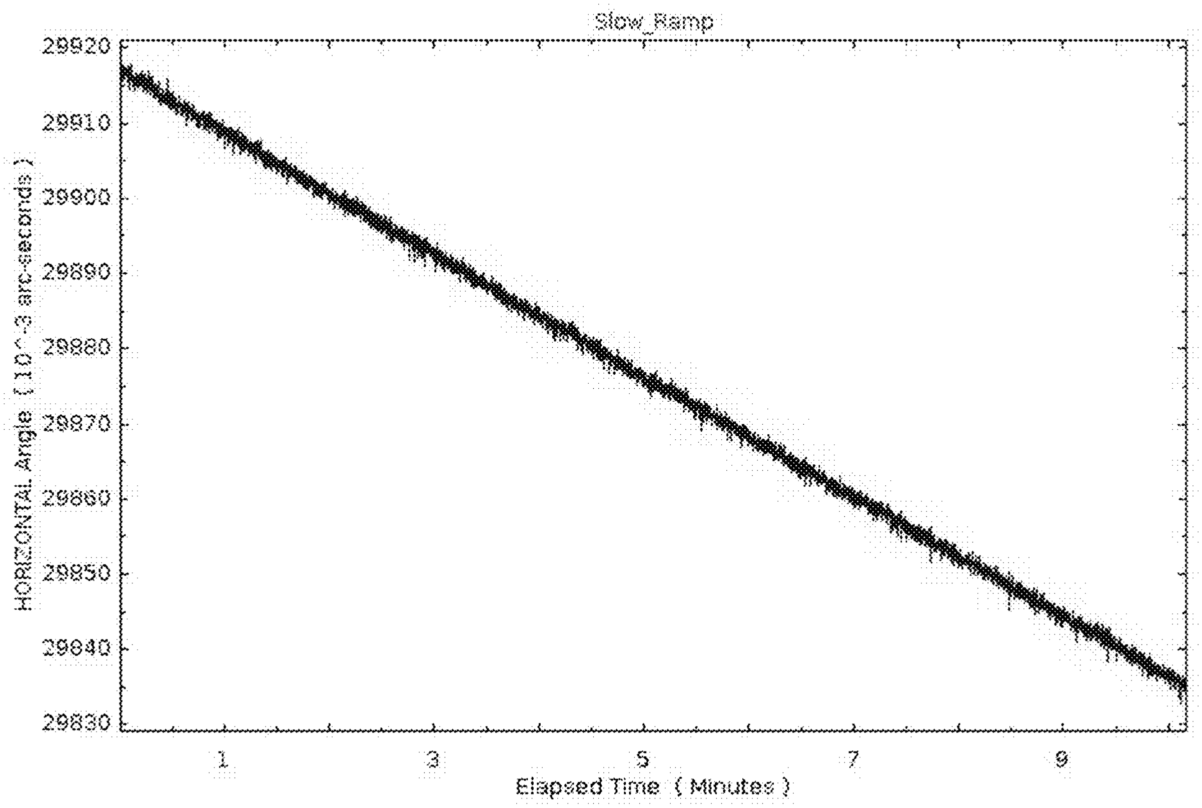
FIG. 10 is a graph showing the measured response to a slowly varying angle over a time span of 10 minutes.
Figure 11:
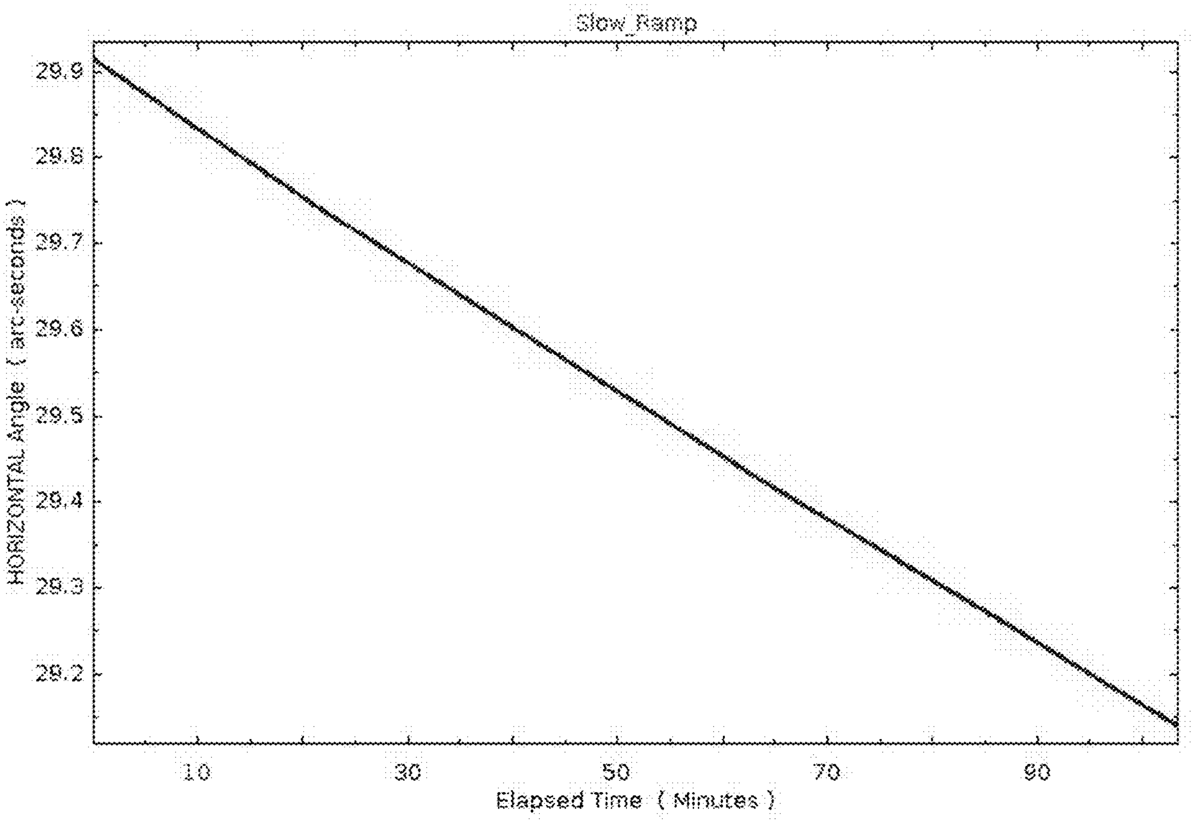
FIG. 11 is a graph showing the measure response to a slowly varying angle over a time span of 100 minutes.

FIG. 10 shows all (roughly 6000) individual measurements taken with the angle of test mirror 328 changing smoothly through all angles along a very slow ramp of about 0.080 arc seconds over a time interval of 10 minutes. No averaging or other data smoothing was applied to the raw measurements calculated by the method described herein. The measurements follow a low noise, smooth linear path, as they should. FIG. 11 shows all of the individual measurements in similar ramp data over a much longer time period of 100 minutes (roughly 60,000 measurements) covering about 0.8 arc seconds. This corresponds to a movement of the reticle image 327 by somewhat more than the width of one pixel 361 across the sensor 360. Eliminating the periodic error due to the sensor pixels and using data from a large number of pixels according to the present invention lowers the noise level and smooths the data making such high quality measurements possible.

It may be appreciated that for a single "star-shaped" reticle pattern, such as that shown in FIG. 3A of FIG. 4, the position of the reticle image may be defined as the average of the positions of the intersection points of all pairs of distinct lines in pixel coordinates. In the case of multiple smaller patterns, as in FIG. 5A, the position of each individual pattern 331 may be determined and averaged to ascertain an effective (presumed position of the compound pattern 331'). In aspects, each of the individual patterns 331 which make up compound pattern 331' may be the same. In other aspects, individual patterns 331 may be different from each other, or some may be the same.

In further method aspects, initial position information for each line segment 325*a*, 325*b*, for instance, in the reticle image along with a rough estimate of the center, is determined by any common image processing method for identifying lines in an image. This provides a convenient starting point, yet the accuracies of the line information and center are not yet sufficient. A more accurate mathematical representation of the center line of each line segment is obtained. For instance, where a line segment has slope m, with $|m|>=1$, examination is made of a cross-section of the line's intensities along each row where the line crosses and is within the region of data being used, 329. Intensities are measured at integer row and column pixel positions and it is assumed that the intensities along the row are measured at the vertical center of the pixels along a particular row. To obtain an accurate, fractional column value for the line center in that row, an appropriate peak shape is fit to the measured intensities along that row. The center coordinate of the fitted peak shape is used to obtain a fractional column number for the position of the line center in that row. After finding the center point of the line segment in each row, a straight line is fit to the collection of center points to obtain the equation of the center line for the line segment.

Where the line segment has slope m, with $|m|<1$, examination is made of the cross-section of the line's intensities along each column which crosses the line and is within the region of data being used, 329. Intensities are only measured at integer row and column pixel positions and it is assumed that the intensities along the column are measured at the center of the pixels along that column. To obtain an accurate, fractional row value for the line center in that column, an appropriate peak shape is fit to the measured intensities along that column. The center coordinate of the fitted peak shape is used to obtain the fractional row number for the position of the line center in that column. After finding the center point of the line segment in each column, a straight line is fit to the collection of center points to obtain the equation of the center line for the line segment.

The equations of the center lines of the line segments are used to find the position of the center of the image of the reticle pattern. In one instance, if the reticle has only one "star-shaped" pattern, similar to that in FIG. 3A, or FIG. 4, the position of the center of the reticle pattern is calculated as the average of the positions of the points of intersection of each pair of center lines. If the reticle has a compound pattern, consisting of multiple "star-shaped" sub-patterns, as in FIG. 5A, then the position of each sub-pattern is first calculated as noted herein. The position of the center of the compound reticle is then calculated as the average of the positions of the centers of the sub-patterns. Utilizing several line segments, as with the reticles of the present invention, and with reduced periodic error, provides an increased amount of relevant and quality data for determining the location of the reticle image, and results in highly accurate measurements compared to prior systems.

Figure 5B:
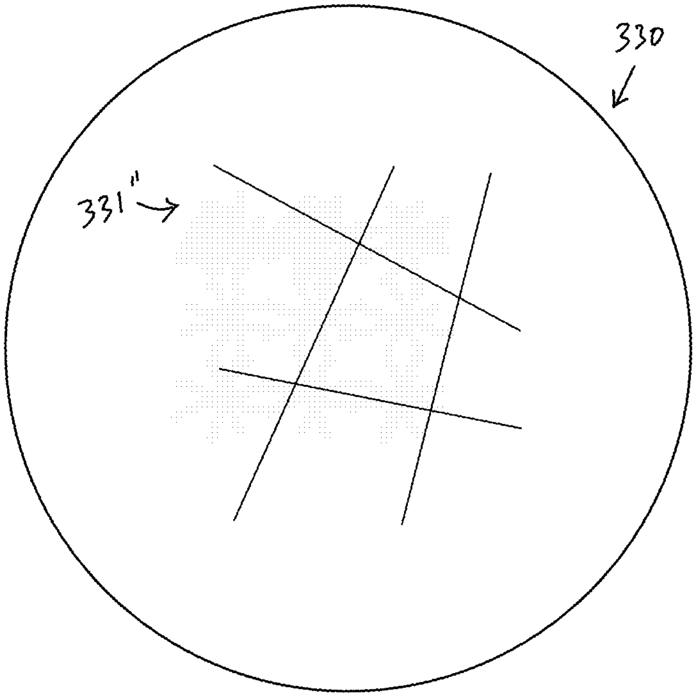
FIG. 5B is an example of an embodiment of a reticle in accordance with the present invention.

FIG. 5B shows another representative reticle 330 in accordance with further aspects of the invention. FIG. 5B shows a reticle 330 having a unique pattern 331" where there is not a common intersecting point of the line segments or extending lines from the segments. In one aspect, pattern 331" combines lines with slopes 2, 3, −½ and −⅓ in a pattern where there is not a common intersection point. The position of the image can be defined as the average of the four intersection points shown. There will be two other intersecting points of the extended line segments, but those will not be as accurately determined because the slopes are nearly equal (or at least closer to parallel. The extensions of lines with slopes 2, 3 intersect far above the figure while the extensions of line segments with slopes −½, −⅓ intersect far to the right. It may be appreciated that the line segments don't have to intersect to a common point, and a variety of configurations of line segments are possible. The line segments may form a square or rectangle, with the corners connecting or with corners configured in a spaced relationship without connection of the line segments. The line segments may form other shapes such as triangles or other polygonal shapes. The averaging of the intersections of the line segments or extending lines is used as a center point of the pattern 351".

Figure 5C:
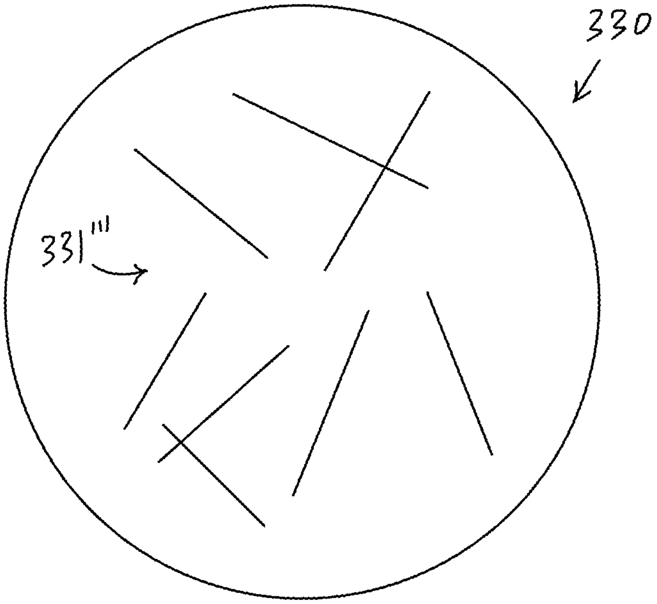
FIG. 5C is an example of an embodiment of a reticle in accordance with the present invention.

FIG. 5C shows a further scattered line segment pattern 331''', with some segments intersecting, although such intersection of segments is not necessary. In this aspect, the scattered pattern 331'''' includes lines with slopes +−2, +−3, +−½, and +−⅓. The position of the pattern may be defined as the average of all 28 intersection points of the extended lines determined by the segments. While use of pairs of lines which intersect perpendicularly or nearly perpendicularly (or lines that are less parallel) tend to produce better results, it may be appreciated that even use of lines which are more closely parallel still allow for defining the position of the pattern image using an average of the intersection points. Note that an intersection point between two lines which are roughly perpendicular can be more accurately determined, as compared, for instance, to lines which are more "nearly" parallel. The calculation of the intersection point of "nearly" parallel lines are more affected by noise and other errors in the data. Note the width of the image of each line segment 326 will extend across multiple pixels given the very small size of the sensor pixels 361. Optical blurring of the projected lines 326 is introduced into the system due to diffraction effects, and the non-zero width of the line segments on the reticle. For purposes of analyzing the position of the reticle image 326, the analysis methods herein determine the center line 700 of the image of each segment. In the case of two relatively "wide" lines, the width of the line represents uncertainty due to errors. For instance, with intersection of lines which are more "nearly" parallel, the region of overlap will be greater as compared to lines which overlap more perpendicularly. Accordingly, there is some benefit of accuracy when determining intersections involving lines which are oriented more perpendicularly. Even so, the invention is not limited to use of lines having slopes of +/−n and −/+1/n, but may also includes lines of slopes +/−m and −/+1/m, where m is a real number or a positive integer. It may also be appreciated that the patterns 331", 331'" may also repeat upon the reticle to form composite patterns similar to the composite shown in FIG. 5A. A variety of the same together with different repeated patterns may also be utilized. The notation "+/−n and −/+1/n" herein means that when n is positive, 1/n is negative, and when n is negative, 1/n is positive, and vice versa.

In general, a reticle 330 with appropriately selected line segments for reducing the periodic error attributable to sampling with the sensor is used to determine an amount of movement of a test object. To provide more accurate measurements it is best to be able to accurately determine a center of the reticle image, and to more accurately determine a center of the reticle image it is best to be able to accurately calculate line equations associated with the line segments of the reticle image. This general framework is presented above and herein with respect to use of specially designed or specially oriented reticles, in conjunction with the processes generally outlined with respect to FIG. 12, FIG. 13 and FIG. 14.

Figure 12:
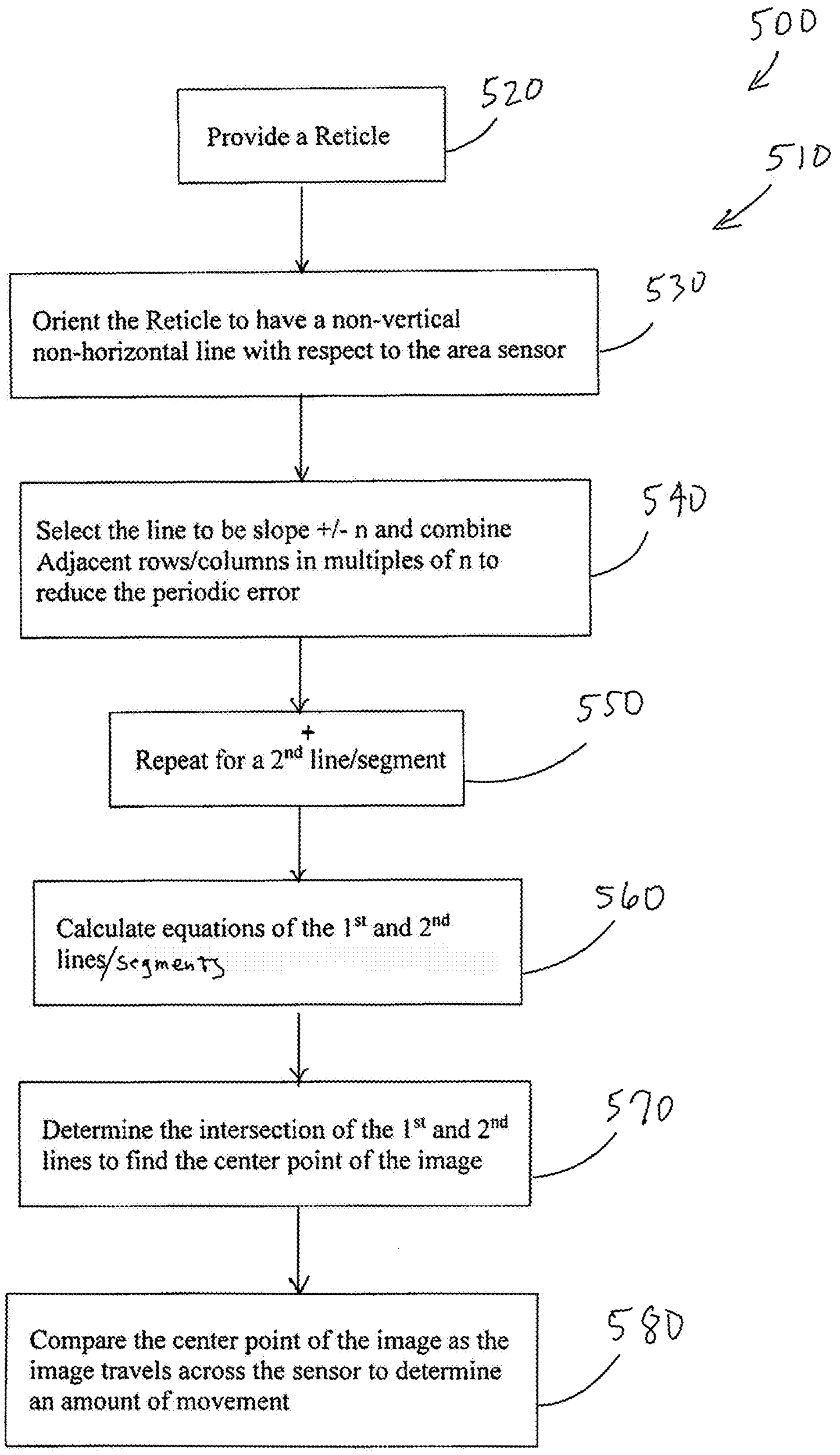
FIG. 12 is a flow diagram in accordance with method aspects of the present invention.

In aspects, methods of the invention are presented with reference to FIG. 12. In one aspect, a method 500 of determining an amount of movement of an object utilizes a method 510 of reducing period error in measurement of light intensity associated with an area sensor having an array of pixels arranged in rows and columns defining vertical and horizontal reference lines, the periodic error due to sampling of an image on the array of pixels. Methods 500, 510 include providing a reticle 330 at step 520 and orienting the reticle 330 to have a non-vertical, non-horizontal line with respect to the area sensor at step 530. Such orientation provides reduced periodic error as noted previously. At step 540 the line is selected to have a slope +/−n and includes combining light data from adjacent rows/columns of pixels in multiples of n (where n is a positive integer) to reduce the periodic error. The process repeats at step 550 for a second line or line segment (i.e., with light data derived from pixels corresponding to a second line segment of the reticle 330). The process may repeat multiple times at step 550 for additional line or line segments. Utilizing the data collected in the previous steps, step 560 includes calculation of equations of the first and second or multiple lines or line segments. Having calculated the respective equations, step 570 includes determining the intersection points of the respective lines or line segments (i.e., light data intensity of the line image on corresponding pixels) and determining a center point of the image of the reticle comprising the line segments. At step 580 a comparison of the center point of the image as the image travels across or about the sensor 360 (due to, for instance, rotation of a test object or test mirror) is undertaken to determine an amount of movement of the test object or test mirror 328.

Figure 13:
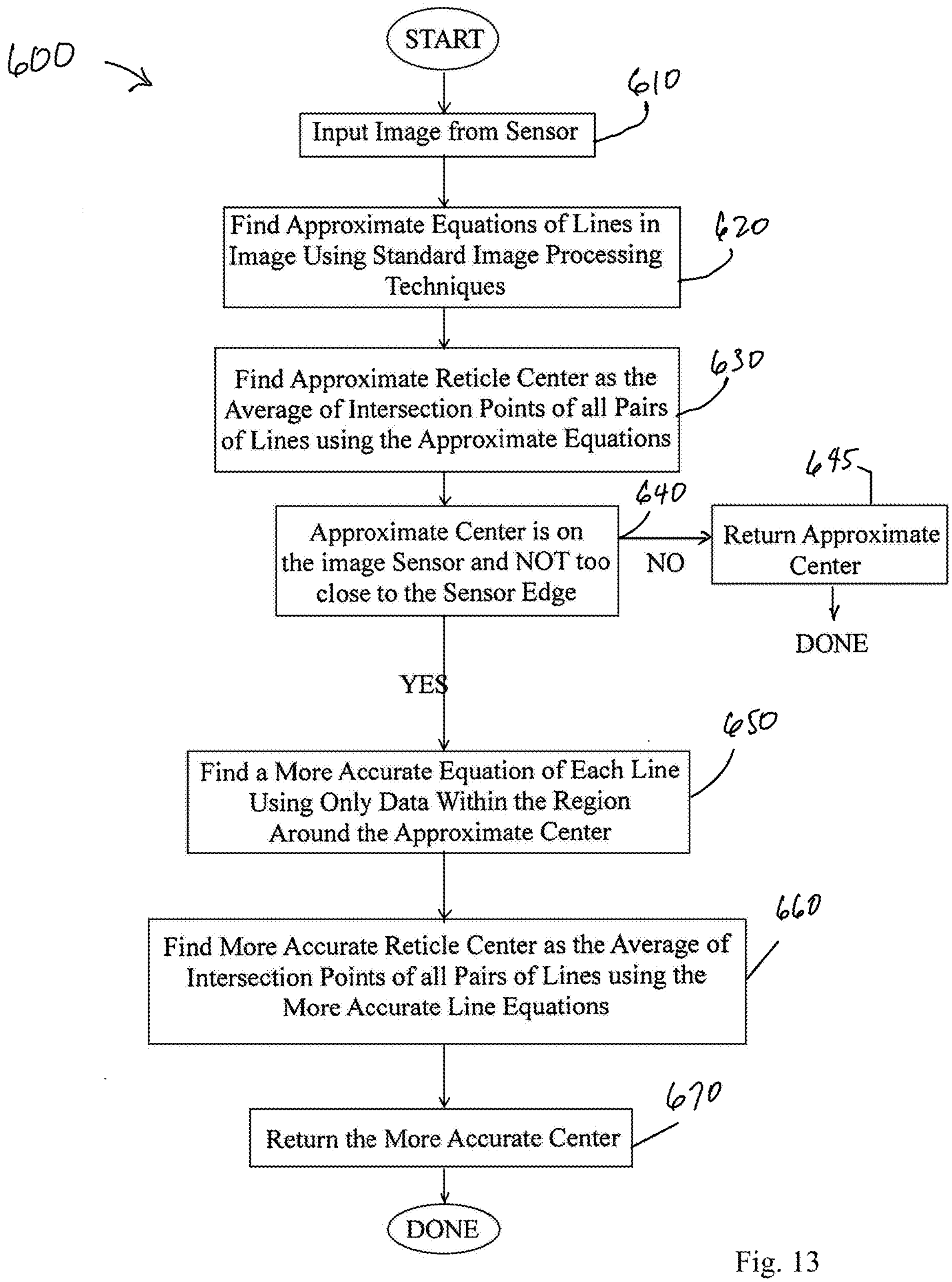
FIG. 13 is a flow diagram in accordance with method aspects of the present invention.

In further aspects, methods of the invention are presented with reference to FIG. 13, where method 600 of determining an accurate center of the reticle image 327 on the sensor includes input of image data from the sensor at step 610, such as inputting light intensity data from pixels associated with the image 327 into a computer system or database or processing engine. Next, at step 620 standard image processing techniques are used to find approximate equations of lines or line segments associated with the image 327 as detected on the sensor. Step 630 includes finding an approximate reticle center as the average of intersection points of the lines or line segments for pairs of lines using the previous equations. In aspects, multiple pairs of lines may be utilized. At step 640, determination is made as to whether the approximate center is found on the image sensor while also not being too close to an edge of the sensor. In the case where the approximate center is either off the sensor or is on the sensor and is too close to the sensor edge (based on a desired or selected proximity value), i.e., "NO" is the result at step 640, the approximate center is selected as the center location of the reticle image 327. This approximate center information is returned (at step 645) to the computing system and utilized for determining movement of the test object. Otherwise, in the case where the approximate center is on the sensor and is not too close to the edge of the sensor (a YES result at step 640), a method 650 to accurately determine or more accurately determine equations of each line is undertaken. Such method or methods is further presented below and in reference to FIG. 14. In aspects, the method includes using only data within a region around the approximate center of the image or sensor display is undertaken. The more accurate equations are utilized at step 660 to find a more accurate reticle center using the average of intersection points of a pair or multiple pairs of lines using the more accurate line equations. The more accurate center is returned at step 670 for use in determining movement of the test object. In further aspects, the line segment and line equations are associated with segments and lines which are mismatched from the vertical and horizontal references of the pixel array of the sensor in order to reduce periodic error due to sampling, and together with use of a broader range of pixel data from the sensor, provide highly accurate and low noise data for improved line calculations to better determine the location of the reticle image and thus better determine movement of the test object.

Figure 14:
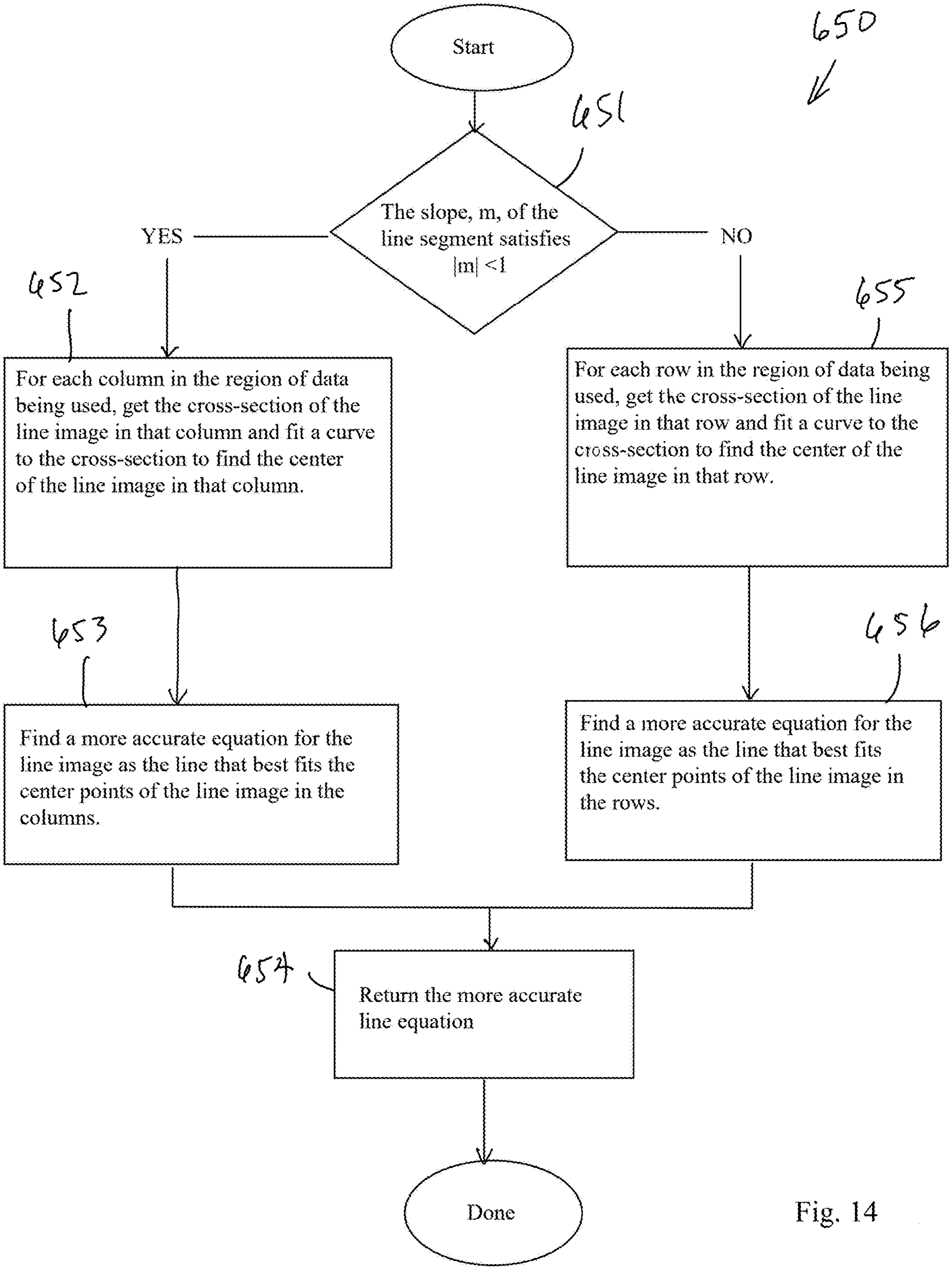
FIG. 14 is a flow diagram in accordance with method aspects of the present invention.

In further aspects, methods of the invention are presented with reference to FIG. 14, where method 650 of determining accurate line equations is presented. In aspects, a decision is made at step 651 where if the slope, m, of the line segment satisfies the equation $|m|<1$, then the method at YES leads to step 652, otherwise, step 655. At step 652, for each column in the region of data being used, light intensity data relating to a cross-section of the line image in that column of pixels is obtained or utilized, and a curve is fit to the cross-section data to determine a center of the line image for that column. Fitting a curve allows for more accurately locating a center of the line which may include identifying a fractional component of a pixel. Thereafter, utilizing the center points in multiple columns, at step 653, a more accurate equation for the line image is obtained using a line which best fits the multiple center points of the line image in the columns. Such accurate line equation is returned for use within the system, which subsequently allows for more accurate determination of movement of a test object. If the determination at step 651 is not satisfied, i.e., with a NO, the process leads to step 655 where a similar sequence follows but with respect to the data associated with the various rows of pixels. At step 655 for each row in the region of data being used, light intensity data relating to a cross-section of the line image in that row of pixels is obtained or utilized, and a curve is fit to the cross-section data to determine a center of the line image for that row. Fitting a curve allows for more accurately locating a center of the line which may include identifying a fractional component of a pixel. Thereafter, utilizing the center points of multiple rows, at step 656, a more accurate equation for the line image is obtained using a line which best fits the multiple center points of the line image in the rows. Such accurate line equation is returned for use within the system, which subsequently allows for more accurate determination of movement of a test object.

Figure 15:
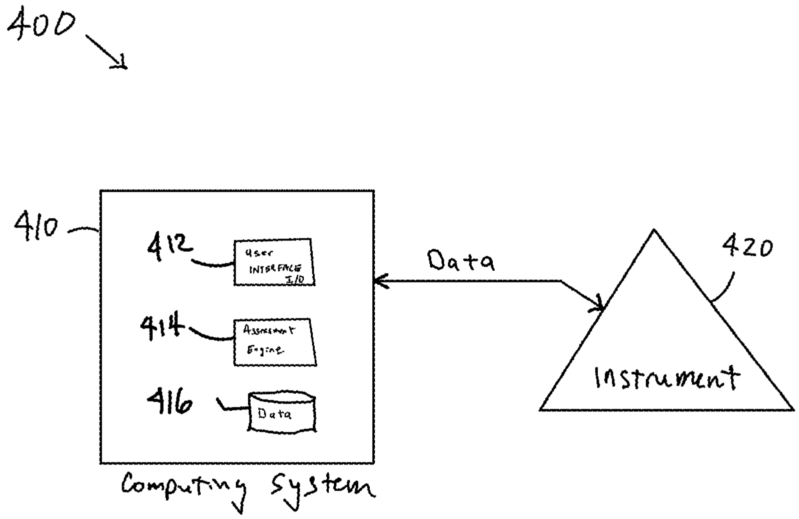
FIG. 15 is a diagram of functional modules, databases and other components in a representative aspect of a system and environment in accordance with the invention.

FIG. 15 is a diagram of functional modules, databases and other components in further representative aspects of a measurement system 400. In some aspects, system 400 comprises one or more functional components/modules that work together to generate and provide location data and determine movement of a test object. These modules may be implemented in software, firmware, and/or hardware, alone or in various combinations. FIG. 15 shows a measurement system 400 comprising a computing system 410 and an instrument 420. The instrument may include a sensor, and in further aspects, the instrument may be an autocollimator 300 or other instrument having a sensor, including an area sensor. In one aspect system 410 includes at least a user interface I/O module 412, Assessment Engine 414 and Database 416. The user interface engine 412 facilitates user access to, and customization of, various features of the system 410. A user utilizing the system may interact with the assessment engine 414 and database 416 to provide algorithms and input or export data and alter settings of the system 410 or instrument 420. The assessment engine 414 generates the equations and calculates the intersections and center points and undertakes the averaging and other handling of the data received from the instrument 420 or form database 416. A presentation engine may also be used to present visual representation, such as position data, and movement data of a test object, light image data and other information or representations. The assessment engine may include computer programs to undertake operation of the methods of the invention.

In further aspects the invention includes a computing system for reducing period error in measurement of light intensity associated with an area sensor having an array of pixels arranged in rows and columns defining vertical and horizontal reference lines, the periodic error due to sampling of an image on the array of pixels. The computing system includes a memory storing data associated with a light pattern of the image on the sensor, the pattern including or defining at least one non-vertical non-horizonal line segment, and one or more processors configured with computer-executable instructions to: combine measurements of light intensity of pixels associated with the at least one line segment, the at least one line segment having a slope of +−n where n is a positive integer, the combining including combining the measurements of light intensity of adjacent rows or columns in multiples of n to reduce the period error. In one aspect, when one of the slopes is +n, the other is −1/n, and when one of the slopes is −n, the other is +1/n.

In further aspects the invention includes a computing system for determining an amount of movement of a test object measured by an autocollimator, the system including a memory storing data associated with a light pattern on pixels of an area sensor, the pattern including or defining at least one non-vertical non-horizonal line segment, and one or more processors configured with computer-executable instructions to: combine measurements of light intensity of pixels associated with the at least one line segment, the at least one line segment having a slope of +−n where n is a positive integer, the combining including combining the measurements of light intensity of adjacent rows or columns in multiples of n, undertaking the same steps for a second non-vertical non-horizontal line segment, and intersecting the two lines to find the center point. Multiple lines may be used and averaged to locate or determine the center of the image. Comparing the center of the image allows a user to determine the amount of movement of a test object as noted herein.

In further aspects the invention includes non-transitory computer-readable media including computer-executable instructions that, when executed by a computing system, cause the computing system to obtain light intensity data of pixels associated with at least one line segment of a pattern of an image projected on an area sensor having an array of pixels arranged in rows and columns defining vertical and horizontal reference lines, a periodic error in measurement of light intensity associated with the area sensor due to sampling of the image on the array, the at least one line segment having a slope of +−n where n is a positive integer, and calculate the equation of the at least one line segment, the calculation including combining measurement of the light intensity of adjacent rows or columns in multiples of n to reduce the periodic error.

A computer program product of the invention may include a computer readable storage medium (or media) having computer readable program instructions thereon for causing a processor or processors to carry out aspects of the present invention.

The computer readable storage medium can be a tangible device that can retain and store instructions for use by an instruction execution device or devices. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to the invention. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative aspects, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be understood, of course, that the foregoing relates to exemplary embodiments of the invention and that modifications may be made without departing from the spirit and scope of the invention as set forth in the following claims.

I claim:

1. A method of reducing period error in measurement of light intensity associated with an area sensor having an array of pixels arranged in rows and columns defining vertical and horizontal reference lines, the periodic error due to sampling of an image on the array of pixels, the method comprising:

providing a reticle having a pattern such that light passing through the reticle forms a light pattern on the pixels of the area sensor in the form of the pattern or inverse of the pattern; and orienting the reticle such that the pattern includes or defines at least one non-vertical non-horizontal line segment whereby combining measurements of the light intensity of pixels associated with the light pattern of the at least one line segment reduces the periodic error.

2. The method of claim 1 where the area sensor is an area sensor of an autocollimator.

3. The method of claim 1 wherein the at least one line segment has a slope of +2 with respect the vertical and horizontal reference lines.

4. The method of claim 1 wherein the at least one line segment has a slope chosen from the group of +2, −2, +½, −½, +3, −3, +⅓, −⅓.

5. The method of claim 1 where the pattern includes at least another line segment where a line extending therethrough intersects with a line extending through the at least one line segment.

6. The method of claim 5 where the slopes, respectively, of the at least one line segment and the at least another line segment are (+2, −½), (−2, +½), (+½, −½), (+2, −2), (+3, −⅓), (−3, +⅓), (+3, −3) or (+⅓, −⅓).

7. The method of claim 5 where the at least one line segment and the at least another line segment define a first sub-pattern, the pattern including or defining at least another sub-pattern of line segments where lines extending through the line segments intersect.

8. The method of claim 7 where the pattern includes a plurality of sub-patterns of line segments where lines extending through the line segments intersect.

9. The method of claim 5 where the reticle pattern includes the at least one line segment having a slope of +2, the at least another line segment having slope −½, a third line segment having slope −2 and a fourth line segment having slope +½.

10. The method of claim 9 where each of the line segments lies along a respective extending line extending through respective line segments, the reticle pattern including a further line segment associated with each of the respective extending lines, the further line segments separated from respective line segments to form a central portion of pattern devoid of line segments.

11. The method of claim 1 further comprising combining measurements of the light intensity of pixels associated with the light pattern of the at least one line segment to reduce the periodic error.

12. The method of claim 11 where the at least one line segment has a slope of +2 or −2 and the combining of measurements includes combining the measurements of adjacent rows or columns, in multiples of 2, to obtain a measurement having reduced periodic error.

13. The method of claim 11 where the at least one line segment has a slope of +3 or −3 and the combining of measurements includes combining the measurements of adjacent rows or columns, in multiples of 3, to obtain a measurement having reduced periodic error.

14. The method of claim 11 where the at least one line segment has a slope of +−n where n is a positive integer, and the combining of measurements includes combining the measurements of adjacent rows or columns, in multiples of n.

15. The method of claim 1 where the at least one line segment crosses successive rows or successive columns at different phase locations.

16. The method of claim 15 where a centerline of the at least one projected line segment intersects successive pixel rows at different phase locations or intersects successive columns at different phase locations.

17. The method of claim 1 where the periodic error corresponds to a regular spacing of successive pixels, the periodic error being in phase corresponding to the regular spacing, the at least one line segment having a slope such that light projecting through the reticle projects a line image which intersects successive pixel rows at different phase locations or intersects successive pixel columns at different phase locations, the method further comprising combining measurements of the light intensity of pixels associated with the light pattern of the at least one line segment to reduce the periodic error.

18. The method of claim 1 where the periodic error from even numbered rows of pixels is out of phase by ½ cycle relative to periodic error from odd numbered rows of pixels, the reticle oriented such that the at least one line segment has slope +2 or −2.

19. A device, comprising:

an area sensor having an array of pixels arranged in rows and columns defining vertical and horizontal reference lines and producing a periodic error due to sampling of an image on the array of pixels; and a reticle having a pattern such that light passing through the reticle forms a light pattern on the pixels of the area sensor in the form of the pattern or inverse of the pattern, the reticle oriented such that the pattern includes or defines at least one non-vertical non-horizontal line segment whereby combining measurements of light intensity of pixels associated with the light pattern of the at least one line segment reduces the periodic error.

20. The device of claim 19 where the periodic error is associated with the area sensor of an autocollimator, the periodic error being in phase corresponding to a regular spacing of successive pixels of the area sensor, the at least one line segment having a slope such that light projecting through the reticle projects a line image which intersects successive pixel rows at different phase locations or intersects successive pixel columns at different phase locations, the method further comprising combining measurements of light intensity of pixels associated with the light pattern of the at least one segment, the at least one line segment having a slope of +−n where n is a positive integer, the combining of measurements includes combining the measurements of adjacent rows or columns in multiples of n.

21. A reticle for use with an area sensor having an array of pixels arranged in rows and columns defining vertical and horizontal reference lines and producing a periodic error due to sampling of an image on the array of pixels, the reticle comprising:

a transparent base having a pattern such that light passing through the base forms a light pattern on the area sensor in the form of the pattern or inverse of the pattern, the pattern includes at least two line segments having respective slopes of +/−n and −/+1/n where n is a positive real number, and if the two line segments are perpendicular, the pattern also includes another line segment with slope −/+n or +/−1/n.

22. The reticle of claim 21 where n is a positive integer, the pattern including another line segment with slope −/+n or +/−1/n.

23. The reticle of claim 21 where the pattern includes eight line segments having respective slopes of +2, +2, −2, −2, +½, +½, −½, −½.

24. The reticle of claim 21 where each of the line segments defines an extended line, the reticle pattern including a further line segment oriented along each of the respective extended lines, the further line segments separated from respective line segments to form a central portion of the reticle pattern devoid of line segments.

25. The reticle of claim 21 further comprising a third line segment, each of the line segments extending along an extending line, the first and second segments having extending lines intersecting at a point, the third line segment having an extending line which avoids intersection at the point.

26. A method of establishing a position of a center point of a reticle image caused by projecting light through a reticle onto an area image sensor, the sensor having an array of pixels arranged in rows and columns defining vertical and horizontal reference lines and producing a periodic error due to sampling of the reticle image on the array of pixels, the method comprising:

determining an equation of a first line corresponding to light projected from a first line segment of the reticle onto pixels of the image sensor, the first line segment of the reticle being a non-vertical non-horizontal line segment whereby combining measurements of light intensity from the pixels associated with the light projected from the first line segment reduces the periodic error;

determining an equation of a second line corresponding to light projected from a second line segment of the reticle onto pixels of the image sensor, the second line segment of the reticle being a non-vertical non-horizontal line segment whereby combining measurements of light intensity from the pixels associated with the light projected from the second line segment reduces the periodic error; and analyzing the equation of the first line and the equation of the second line to determine an intersecting point of the lines to establish a position of the center point of the reticle image upon the sensor.

27. The method of claim 26 where the reticle image is projected onto an area sensor of an autocollimator, where determining an equation of a first line includes determining a center point of the projected light image from the first line segment at successive pixel rows or columns, the equation being a line which best fits the center points.

28. The method of claim 26 where the determining of a center point of the projected line image at successive pixel rows or columns includes fitting a curve to data intensity points at each of the successive rows or columns, a location of a peak of the curve defining the center point for the respective row or column.

29. The method of claim 28 where the location of the peak is a fractional column position or a fractional row position.

30. The method of claim 28 where fitting a curve to the data intensity points includes fitting a Gaussian curve to the data and using a center of the Gaussian distribution as a fractional column position or fractional row position of the line image center at the respective column or row.

31. The method of claim 26 where the reticle includes multiple sub patterns which make up a compound pattern, each of the sub patterns including at least two line segments, each of the line segments lies along a respective extending line extending through respective line segments, the extending lines intersecting at a point, and averaging the location of points to determine a center point of the compound pattern.

32. The method of claim 31 where the at least two line segments themselves avoid intersecting.

* * * * *